(12) United States Patent
Keefer et al.

(10) Patent No.: US 6,902,602 B2
(45) Date of Patent: Jun. 7, 2005

(54) GAS SEPARATION BY COMBINED PRESSURE SWING AND DISPLACEMENT PURGE

(75) Inventors: Bowie G. Keefer, Galiano Island (CA); Matthew L. Babicki, West Vancouver (CA); Andre Jason Joseph Boulet, Vancouver (CA); Aaron M. Pelman, Vancouver (CA); Brian G. Sellars, Coquitlam (CA); Surajit Roy, Burnaby (CA)

(73) Assignee: QuestAir Technologies Inc., Burnaby (CA)

( * ) Notice: Subject to any disclaimer, the term of this patent is extended or adjusted under 35 U.S.C. 154(b) by 0 days.

(21) Appl. No.: 10/389,539

(22) Filed: Mar. 14, 2003

(65) Prior Publication Data

US 2004/0011198 A1 Jan. 22, 2004

Related U.S. Application Data

(60) Provisional application No. 60/364,772, filed on Mar. 14, 2002.

(51) Int. Cl.[7] .................... B01D 53/047; B01D 53/06
(52) U.S. Cl. .............. 95/97; 95/113; 95/139; 96/125; 96/130; 96/144; 96/150
(58) Field of Search .................. 95/97, 98, 100, 95/103–105, 107, 113, 139; 96/108, 130, 121–125, 136, 150, 142–144

(56) References Cited

U.S. PATENT DOCUMENTS

| | | |
|---|---|---|
| 3,094,569 A | 6/1963 | Thomas |
| 3,176,445 A * | 4/1965 | Collins et al. ............ 95/104 |
| 3,204,388 A | 9/1965 | Asker |

(Continued)

FOREIGN PATENT DOCUMENTS

| | | |
|---|---|---|
| CA | 1256038 | 6/1989 |
| CA | 2016045 | 8/1994 |

(Continued)

OTHER PUBLICATIONS

Carvill et al., *AIChE J*. 42(10):2765–2772, 1996.
Ding et al., *Chemical Engineering Science* 55:3461–3474, 2000.
Ding et al., *Chemical Engineering Science* 55:3929–3940, 2000.
Iyuke et al., *Chemical Engineering Science* 55:4745–4755, 2000.
International Search Report from International Application No. PCT/CA99/00823.
International Search Report from International Application No. PCT/CA02/00368.

(Continued)

*Primary Examiner*—Robert H. Spitzer
(74) *Attorney, Agent, or Firm*—Klarquist Sparkman, LLP

(57) ABSTRACT

The present disclosure relates to systems and processes for adsorptive gas separations where a first gas mixture including components A and B is to be separated so that a first product of the separation is enriched in component A, while component B is mixed with a third gas component C contained in a displacement purge stream to form a second gas mixture including components B and C, and with provision to prevent cross contamination of component C into the first product containing component A, or of component A into the second gas mixture containing component C. The invention may be applied to hydrogen (component A) enrichment from syngas mixtures, where dilute carbon dioxide (component B) is to be rejected such as directly to the atmosphere, and with preferably nitrogen-enriched air as the displacement purge stream containing residual oxygen (component C).

31 Claims, 14 Drawing Sheets

U.S. PATENT DOCUMENTS

| | | | |
|---|---|---|---|
| 3,430,418 A | 3/1969 | Wagner | |
| 3,513,631 A | 5/1970 | Siebert et al. | |
| 3,564,816 A | 2/1971 | Batta | |
| 3,594,984 A | 7/1971 | Toyama et al. | |
| 3,847,672 A | 11/1974 | Trocciola et al. | |
| 3,865,924 A | 2/1975 | Gidaspow et al. | |
| 4,019,879 A | 4/1977 | Rabo et al. | |
| 4,144,037 A | 3/1979 | Armond et al. | |
| 4,153,434 A | 5/1979 | Settlemyer | |
| 4,200,682 A | 4/1980 | Sederquist | |
| 4,233,038 A * | 11/1980 | Tao | 95/104 |
| 4,272,265 A | 6/1981 | Snyder | |
| 4,322,394 A | 3/1982 | Mezey et al. | |
| 4,354,859 A | 10/1982 | Keller et al. | |
| 4,406,675 A | 9/1983 | Dangieri et al. | |
| 4,431,432 A * | 2/1984 | Amitani et al. | 95/100 |
| 4,452,612 A | 6/1984 | Mattia | |
| 4,530,705 A | 7/1985 | Firey | |
| 4,532,192 A | 7/1985 | Baker et al. | |
| 4,553,981 A | 11/1985 | Fuderer | |
| 4,555,453 A | 11/1985 | Appleby | |
| 4,578,214 A | 3/1986 | Jungerhans | |
| 4,587,114 A | 5/1986 | Hirai et al. | |
| 4,595,642 A | 6/1986 | Nakanishi et al. | |
| 4,690,696 A * | 9/1987 | Sircar et al. | 95/97 |
| 4,696,682 A | 9/1987 | Hirai et al. | |
| 4,702,903 A | 10/1987 | Keefer | |
| 4,726,816 A | 2/1988 | Fuderer | |
| 4,743,276 A | 5/1988 | Nishida et al. | |
| 4,758,253 A | 7/1988 | Davidson et al. | |
| 4,759,997 A | 7/1988 | Ohyauchi et al. | |
| 4,781,735 A | 11/1988 | Tagawa et al. | |
| 4,783,433 A | 11/1988 | Tajima et al. | |
| 4,790,858 A | 12/1988 | Sircar | |
| 4,801,308 A | 1/1989 | Keefer | |
| 4,816,121 A | 3/1989 | Keefer | |
| 4,914,076 A | 4/1990 | Tsuji et al. | |
| 4,917,711 A | 4/1990 | Xie et al. | |
| 4,963,339 A | 10/1990 | Krishnamurthy et al. | |
| 4,968,329 A | 11/1990 | Keefer | |
| 4,969,935 A | 11/1990 | Hay | |
| 4,988,580 A | 1/1991 | Ohsaki et al. | |
| 5,068,159 A | 11/1991 | Kinoshita | |
| 5,079,103 A | 1/1992 | Schramm | |
| 5,082,473 A | 1/1992 | Keefer | |
| 5,096,469 A | 3/1992 | Keefer | |
| 5,096,470 A | 3/1992 | Krishnamurthy | |
| 5,126,310 A | 6/1992 | Golden et al. | |
| 5,133,784 A | 7/1992 | Boudet et al. | |
| 5,147,735 A | 9/1992 | Ippommatsu et al. | |
| 5,175,061 A | 12/1992 | Hildebrandt et al. | |
| 5,227,598 A | 7/1993 | Woodmansee et al. | |
| 5,246,676 A | 9/1993 | Hay | |
| 5,248,325 A | 9/1993 | Kagimoto et al. | |
| 5,256,172 A | 10/1993 | Keefer | |
| 5,256,174 A | 10/1993 | Kai et al. | |
| 5,258,571 A | 11/1993 | Golden et al. | |
| 5,271,916 A | 12/1993 | Vanderborgh et al. | |
| 5,282,886 A | 2/1994 | Kobayashi et al. | |
| 5,328,503 A | 7/1994 | Kumar et al. | |
| 5,360,679 A | 11/1994 | Buswell et al. | |
| 5,366,818 A | 11/1994 | Wilkinson et al. | |
| 5,393,326 A | 2/1995 | Engler et al. | |
| 5,411,578 A | 5/1995 | Watson et al. | |
| 5,415,748 A | 5/1995 | Emiliani et al. | |
| 5,429,665 A | 7/1995 | Botich | |
| 5,431,716 A | 7/1995 | Ebbeson | |
| 5,434,016 A | 7/1995 | Benz et al. | |
| 5,441,559 A | 8/1995 | Petit et al. | |
| 5,487,775 A | 1/1996 | LaCava et al. | |
| 5,509,956 A | 4/1996 | Opperman et al. | |
| 5,523,326 A | 6/1996 | Dandekar et al. | |
| 5,529,763 A | 6/1996 | Peng et al. | |
| 5,529,970 A | 6/1996 | Peng | |
| 5,531,809 A | 7/1996 | Golden et al. | |
| 5,543,238 A | 8/1996 | Strasser | |
| 5,593,478 A | 1/1997 | Hill et al. | |
| 5,604,047 A | 2/1997 | Bellows et al. | |
| 5,632,807 A | 5/1997 | Tomita et al. | |
| 5,645,950 A | 7/1997 | Benz et al. | |
| 5,646,305 A | 7/1997 | Wagner et al. | |
| 5,656,067 A | 8/1997 | Watson et al. | |
| 5,658,370 A | 8/1997 | Vigor et al. | |
| 5,711,926 A | 1/1998 | Knaebel | |
| 5,714,276 A | 2/1998 | Okamoto | |
| 5,766,311 A | 6/1998 | Ackley et al. | |
| 5,811,201 A | 9/1998 | Skowronski | |
| 5,827,358 A | 10/1998 | Kulish et al. | |
| 5,876,486 A | 3/1999 | Steinwandel et al. | |
| 5,891,217 A | 4/1999 | Lemcoff et al. | |
| 5,900,329 A | 5/1999 | Reiter et al. | |
| 5,917,136 A | 6/1999 | Gaffney et al. | |
| 5,925,322 A | 7/1999 | Werth | |
| 5,955,039 A | 9/1999 | Dowdy | |
| 5,958,109 A | 9/1999 | Fuderer | |
| 5,968,680 A | 10/1999 | Wolfe et al. | |
| 5,980,857 A | 11/1999 | Kapoor et al. | |
| 5,981,096 A | 11/1999 | Hornberg et al. | |
| 5,998,056 A | 12/1999 | Divisek et al. | |
| 6,022,399 A | 2/2000 | Ertl et al. | |
| 6,045,933 A | 4/2000 | Okamoto | |
| 6,051,050 A | 4/2000 | Keefer et al. | |
| 6,056,804 A | 5/2000 | Keefer et al. | |
| 6,060,032 A | 5/2000 | Hable et al. | |
| 6,063,161 A | 5/2000 | Keefer et al. | |
| 6,077,620 A | 6/2000 | Pettit | |
| 6,090,312 A | 7/2000 | Ziaka et al. | |
| 6,143,057 A | 11/2000 | Bülow et al. | |
| 6,162,558 A | 12/2000 | Borup et al. | |
| 6,176,897 B1 | 1/2001 | Keefer | |
| 6,190,623 B1 | 2/2001 | Sanger et al. | |
| 6,190,791 B1 | 2/2001 | Hornburg | |
| 6,200,365 B1 | 3/2001 | Eimer et al. | |
| 6,210,822 B1 | 4/2001 | Abersfelder et al. | |
| 6,231,644 B1 | 5/2001 | Jain et al. | |
| 6,255,010 B1 | 7/2001 | George et al. | |
| 6,283,723 B1 | 9/2001 | Milburn et al. | |
| 6,293,998 B1 | 9/2001 | Dolan et al. | |
| 6,296,823 B1 | 10/2001 | Ertl et al. | |
| 6,312,843 B1 | 11/2001 | Kimbara et al. | |
| 6,398,853 B1 | 6/2002 | Keefer et al. | |
| 6,406,523 B1 | 6/2002 | Connor et al. | |
| 6,428,915 B1 | 8/2002 | Ban et al. | |
| 6,461,410 B1 * | 10/2002 | Abe et al. | 95/97 |
| 6,607,854 B1 | 8/2003 | Rehg et al. | |
| 6,663,691 B2 * | 12/2003 | Yamamoto et al. | 95/100 |
| 6,692,545 B2 | 2/2004 | Gittleman et al. | |
| 2001/0047824 A1 | 12/2001 | Hill et al. | |
| 2002/0004157 A1 | 1/2002 | Keefer et al. | |
| 2002/0035924 A1 * | 3/2002 | Keefer | 95/113 |
| 2002/0066367 A1 * | 6/2002 | Keefer et al. | 95/113 |
| 2002/0098394 A1 | 7/2002 | Keefer et al. | |
| 2002/0104518 A1 | 8/2002 | Keefer et al. | |
| 2002/0110503 A1 | 8/2002 | Gittleman et al. | |
| 2002/0110504 A1 | 8/2002 | Gittleman et al. | |
| 2002/0112479 A1 | 8/2002 | Keefer et al. | |
| 2002/0127442 A1 | 9/2002 | Connor et al. | |
| 2002/0142198 A1 | 10/2002 | Towler et al. | |
| 2002/0142208 A1 | 10/2002 | Keefer et al. | |
| 2003/0143448 A1 | 7/2003 | Keefer et al. | |
| 2003/0157390 A1 | 8/2003 | Keefer et al. | |

| | | | | | |
|---|---|---|---|---|---|
| 2004/0005492 A1 | 1/2004 | Keefer et al. | JP | 10325360 | 12/1998 |
| | | | JP | 11214021 A2 | 8/1999 |
| | FOREIGN PATENT DOCUMENTS | | WO | WO 94/04249 | 8/1992 |
| CA | 2109055 | 2/1999 | WO | WO 96/13871 | 5/1996 |
| CA | 2087972 | 1/2000 | WO | WO 98/29182 | 9/1998 |
| CA | 2087973 | 1/2001 | WO | WO 99/28013 | 6/1999 |
| DE | 3913 581 A1 | 11/1990 | WO | WO 99/46032 | 9/1999 |
| EP | 0 341 189 A1 | 8/1989 | WO | WO 00/16425 | 3/2000 |
| EP | 0 345 908 | 12/1989 | WO | WO 00/16880 | 3/2000 |
| EP | 0 143 537 B1 | 3/1990 | WO | WO 00/76630 | 12/2000 |
| EP | 0 143 537 A2 | 3/1990 | WO | WO 01/47050 | 6/2001 |
| EP | 0411506 A2 * | 2/1991 | WO | WO 02/24309 | 3/2002 |
| EP | 0 681 860 A2 | 7/1996 | WO | WO 02/35623 | 5/2002 |
| EP | 0 691 701 A1 | 10/1996 | WO | WO 02/37590 | 5/2002 |
| EP | 0 737 648 | 10/1996 | WO | WO 02/45821 | 6/2002 |
| EP | 0 750 361 A | 12/1996 | WO | WO 02/47797 | 6/2002 |
| EP | 0 751 045 | 1/1997 | WO | WO 02/56400 | 7/2002 |
| EP | 0 853 967 | 7/1998 | | | |
| EP | 1 095 689 A1 | 10/1999 | | | |
| EP | 1 070 531 A2 | 1/2001 | | | |
| EP | 1 172 772 | 1/2002 | | | |
| GB | 2 042 365 | 9/1980 | | | |
| JP | 59075574 A | 4/1984 | | | |
| JP | 62274561 | 11/1987 | | | |
| JP | 62278770 | 12/1987 | | | |
| JP | 63034862 | 2/1988 | | | |
| JP | 63166137 | 7/1988 | | | |
| JP | 05 166528 | 7/1993 | | | |
| JP | 07094200 | 7/1995 | | | |
| JP | 8045526 A2 | 2/1996 | | | |
| JP | 10325360 A | 12/1998 | | | |

OTHER PUBLICATIONS

Vaporciyan and Kadiec, "Periodic Separating Reactors: Experiments and Theory," *AIChE Journal* 35, pp. 831–844 (1989).

Chatsiriwech et al., "Enhancement of Catalytic Reaction by Pressure Swing Adsorption," *Catalysis Today* 20, Elsevier Science, pp. 351–366 (1994).

Hufton et al., "Sorption Enhanced Reaction Process for Hydrogen Production," *AIChE Journal*, vol. 45 No. 2, pp. 248–256 (Feb. 1999).

* cited by examiner

GAS SEPARATION BY COMBINED PRESSURE SWING AND DISPLACEMENT PURGE

CROSS REFERENCE TO RELATED APPLICATION

The present application claims the benefit of the earlier filing date of applicants' now abandoned U.S. provisional application No. 60/364,772, filed Mar. 14, 2002, which is incorporated herein by reference.

FIELD

This application is related to adsorptive gas separation apparatus and systems, particularly rotary adsorptive gas separation apparatus and systems, as well as fuel cell applications, and QuestAir Technologies' related patents and patent applications, including U.S. Pat. No. 6,406,523, Ser. Nos. 09/808,715, 10/039,940, and 60/351,798, the disclosures of which are incorporated herein by reference.

BACKGROUND

For enriching a component A of a feed gas mixture containing components A and B, an adsorbent material over which component B is more readily adsorbed and component A is less readily adsorbed may be provided, as is disclosed in the prior art. The adsorbent material is typically arranged to contact flow channels in adsorbers or adsorbent beds. When the gas mixture is introduced at a feed pressure and temperature to a first end of the adsorber during a feed step of the process, component B is preferentially adsorbed and a first product enriched in component A may be delivered from the second end of the adsorber as it becomes loaded with component B. The adsorber may then be regenerated to desorb component B in reverse flow so that the process may be repeated cyclically.

Regeneration may be achieved by alternative strategies of pressure swing, displacement purge, thermal swing, or combinations thereof. It has also been claimed that regeneration of an electrically conductive (for example carbon-based) adsorbent material loaded with an adsorbed gas (for example carbon dioxide) may be achieved by applying an electric current in so-called electric swing adsorption.

In pressure swing adsorption (PSA) systems or vacuum pressure swing adsorption systems (VPSA) according to the prior art, the total pressure of the gas contacting the adsorber is reduced (pressure swing) following the feed step, thus reducing the partial pressure of component B contacting the adsorbent, and desorbing component B to be exhausted by purging with a reflux fraction of already enriched component A. The total pressure of the gas mixture in the adsorber is elevated while the gas flow in the adsorber is directed from the first end to the second end thereof, while the total pressure is reduced in the regeneration step while the gas flow in the adsorber is directed from the second end back to the first end. As a result, a "light" product (a gas fraction depleted in the more readily adsorbed component and enriched in the less readily adsorbed component A) is delivered from the second end of the adsorber, and a "heavy" product (a gas fraction enriched in the more strongly adsorbed component B) is exhausted from the first end of the adsorber.

Alternatively, the total pressure may be kept approximately constant in the regeneration step, while component B is desorbed by a third preferably less readily adsorbed component C, which was not part of the feed gas mixture, with component C introduced in reverse flow from the second end back to the first end of the adsorbers (displacement purge), thus reducing the partial pressure of component B contacting the adsorbent, and exhausting displaced component B from the first end of the adsorbers. As a result, a first or "light" product (a gas fraction depleted in the more readily adsorbed component B and enriched in the less readily adsorbed component A) is delivered from the second end of the adsorber, and a "heavy" product (a gas mixture including the more strongly adsorbed component B and the displacement component C) is exhausted from the first end of the adsorber.

Regeneration may also be achieved by cyclically raising the temperature (temperature swing) of the adsorbent so as to reduce the adsorptive affinity for all gas species, resulting in desorption of component B which can then be purged in reverse flow by a purge stream either as a reflux of previously enriched component A or by displacement purge with a component C. Thermal swing adsorption (TSA) requires bulk heating and cooling of the adsorbent on a cyclic basis, so has been generally limited to relatively low cycle frequencies in the prior art. The heating step may be achieved by heating the purge stream before admission to the second end of the adsorbers.

Pressure swing and displacement purge may be combined, so that a displacement purge regeneration step is achieved at a lower total pressure than the feed pressure. Similarly, thermal swing may be combined with pressure swing and/or displacement purge regeneration strategies. The distinction of displacement purge processes in the present context is that the displacement purge stream is externally provided and includes a component C that is not contained in the feed gas mixture to be separated, unlike conventional PSA or TSA processes where the purge stream is typically obtained internally as a fraction of the feed gas mixture undergoing separation.

Previously, application of displacement purge processes has been limited by compatibility of components A, B and C. Even within the context of an overall separation being achieved, some intimate mixing will take place due to axial dispersion in the adsorbers, fluid holdup in gas cavities, and leakage across fluid seals and valves. While components B and C must obviously be compatible, as they will be mixed as an intended outcome of the process, cross-contamination between components A and C would also take place to require compatibility of those components as well. Further, the efficient application of known adsorbent materials for performing adsorptive separations utilizing displacement purge-based regeneration techniques has previously been limited due to conventional physical arrangements of the adsorbent material in adsorbers or adsorbent beds, leading to non-optimal separation of some common relatively less-strongly adsorbed feed gas components, particularly when the feed gas also includes another strongly adsorbed component in addition to a desired light product component.

PSA is widely applied in hydrogen purification (e.g. from syngas generated by steam reforming or gasification of a hydrocarbon feedstock, after water gas shifting to minimize carbon monoxide concentration), with components A and B representing hydrogen and carbon dioxide. In that application, displacement purge using air (or any oxygen-containing gas with oxygen appearing as a component C) would in the prior art have been impracticable or at least impractical, owing to the hazards of cross-contamination between hydrogen and oxygen.

SUMMARY OF THE DISCLOSURE

The present disclosure is concerned with adsorptive separation of a first gas mixture containing less readily adsorbed first component (or fraction) A and more readily adsorbed second component (or fraction) B, with adsorber regeneration achieved by displacement purge, either alone or combination with pressure swing or thermal swing regeneration techniques. The displacement purge stream includes a preferably less readily adsorbed than B third component (or fraction) C which will be mixed with component B in the regeneration step. A particular requirement may be to avoid or strictly minimise any mixing between components A and C in externally delivered or discharged gas streams. This requirement may arise in important applications where components A and C are incompatible, for example, when components A and C are mutually chemically reactive, as when component A is a combustible fuel and component C is an oxidant. Other applications also are contemplated where component C may act detrimentally to a system for A in a downstream process, or vice versa.

Thus, in an aspect of the present disclosure, a first gas mixture including components A and B is to be separated so that a first product of the separation is enriched in component A, while component B is mixed with a third gas component C contained in a displacement purge stream to form a second gas mixture including components B and C, and preferably with provision to prevent cross contamination of component C into the first product containing component A, or of component A into the second gas mixture containing component C. In potential applications of such a gas separation, it is necessary that such cross contamination be avoided and strictly minimized for safety or other reasons. Component C may be a major or minor constituent of the displacement purge gas stream.

An apparatus according to an aspect of the present disclosure includes a co-operating set of N adsorbers (where N is an integer and is greater or equal to two), each adsorber having a flow path between first and second ends of the adsorber, and the flow path contacting an adsorbent material within the adsorber, with component B being more readily adsorbed relative to components A and C which are less readily adsorbed by the adsorbent material. The adsorbers may be subjected to a cyclic adsorption process with process steps as set forth below, with a cycle period T and with the N adsorbers sequentially undergoing the steps of the cycle sequentially in staggered phase so that the process is substantially continuous.

The process for each adsorber includes a feed step in which the first gas mixture is admitted at a first total pressure to a first end of the adsorber, while a first or "light" product gas enriched in component A is delivered from a second end of the adsorber as component B is preferentially adsorbed on the adsorbent contacting the flow channel(s) of the flow path within the adsorber. The process also includes a displacement purge step in which displacement purge gas-containing component C is admitted to one end of the adsorber, while a second gas mixture (or "heavy" product gas) is delivered at a second total pressure from the other end of the adsorbers as component B desorbs from the adsorbent. The first and second pressures may be substantially similar, or the second pressure may be substantially less than the first pressure to obtain a pressure swing component for the separation process. Also, the temperatures of the components may vary, such as component C being at a higher temperature than other components, to obtain a temperature swing component for the separation process. In such cases where the pressure and/or temperature of the first product gas and second gas mixture are varied, such variations may be employed to increase the overall efficiency of the separation process.

In an aspect where gas components A and C are incompatible, immediately prior to the displacement purge step, a first "buffer" step is performed in the disclosed process, in order to remove interstitial and adsorbed component A accumulated in the adsorber from the previous feed step, so as to avoid contamination of the second gas mixture (containing components B and C) to be produced in the imminent displacement purge step by component A. Likewise, immediately following the displacement purge step, a second "buffer" step is performed in the disclosed process, in order to remove interstitial and adsorbed component C accumulated in the adsorber from the previous purge step, to avoid contamination of the first product gas to be produced in the following feed step by component C.

The buffer steps according to the present aspect of the disclosure may be accomplished in several ways, including applications of the displacement purge principle by introducing a buffer sweep stream, optionally assisted by reducing the total pressure (e.g. by a modest vacuum) or by varying the temperature of the buffer sweep stream during the buffer steps, such as by reducing the temperature of the buffer gas relative to the feed and or purge gases. Typically, each buffer step will generate an exhaust stream, in which there may be some admixture of components A and C; and such buffer step exhaust streams may be subjected to further processing (such as by combustion to eliminate any unreacted mixture of A and C) for disposal. Buffer sweep gas to achieve displacement purge in the buffer steps may be provided as any less readily adsorbed gas stream. The first buffer sweep gas for a first buffer step preferably should not contain unbound component A, and the second buffer sweep gas for a second buffer step preferably should not contain unbound component C. The first buffer sweep gas may be or may contain displacement purge gas containing component C. The second buffer sweep gas may be or may contain first gas mixture containing component A.

The buffer sweep gas for either buffer step may be selected to be an inert gas, which may be flue gas recycled from combustion of the buffer sweep gas under combustion conditions for each stream such that A is removed from sweep gas for a first buffer step, and C is removed from sweep gas for a second buffer step. Alternatively, any other available less adsorbed gas not containing A or C may be used as a buffer sweep gas. For higher temperature applications, steam may be used as buffer sweep gas.

The total pressure may be reduced (e.g. below the second pressure at which the displacement purge step is conducted) during the buffer steps to assist the removal of components A or C to be purged, and also to avoid any leakage (external to the adsorbers) of components A or C between process steps preceding and following each buffer step. With reduced total pressure in a first buffer step, desorbing component B may assist the purging of component A during that first buffer step. Hence, a minor pressure swing to reduce the total pressure during buffer steps, by a modest level of vacuum if the second pressure is substantially atmospheric, may be used to enhance the reliability of the buffer steps, independently of whether a larger pressure swing is applied to assist the enrichment of component A. Similarly, a minor temperature swing may be implemented during buffer steps to assist in purging of the relevant component, and to thereby enhance the reliability of the buffer step, or alternatively to enhance the efficiency of the following adsorption or desorption step.

If the first pressure is much larger than the second pressure, the process may include additional steps as provided in well-known pressure swing adsorption processes for the depressurization of the adsorber after a feed step and before the first buffer step, and for repressurization of the adsorber after the second buffer step and before the next feed step. Depressurization steps may include cocurrrent and/or countercurrrent blowdown steps. Repressurization steps may include backfill and feed pressurization steps. Depressurization and repressurization steps may be achieved by single or plural pressure equalization steps performed between out-of-phase adsorbers by providing fluid communication between the first or second ends of adsorbers undergoing a pressure equalization step.

In the case that pressure swing is combined with displacement purge in the present disclosed process, it will be understood for greatest generality that any of the steps known for PSA and VPSA processes may be incorporated in the present process, which is characterized by the first and second buffer steps respectively just before and just after the displacement purge step. If desired, a purge step using light product gas or cocurrrent blowdown gas as purge gas may be conducted in addition to (and before or after) the displacement purge step. Similarly in the case that temperature swing is combined with displacement purge in the present disclosed process, it will be understood for greatest generality that any of the steps known for TSA processes may be incorporated in the present process, given that the present process is characterized by the first and second buffer steps respectively just before and just after the displacement purge step.

According to an embodiment of the disclosure, in order to perform the buffer steps with minimal losses of components A and C during those steps, it is desirable that components A and C (and any buffer sweep component D) be weakly adsorbed, and that the number N of adsorbers be relatively large with each adsorber thus having a small inventory of adsorbent material, so that the buffer steps may occupy only a small fraction of the cycle period T.

An apparatus embodiment according to an aspect of the present disclosure includes a first valve means communicating to the first end and a second valve means communicating to the second end of each adsorber, so as to perform in sequence for each adsorber the complete cycle of the feed step, any depressurization steps, the first buffer step, the displacement purge step, the second buffer step, and any repressurization steps.

Multiple directional valve configurations known in the art (e.g. as used in PSA systems) may be used to control gas flows to and from the adsorbers in apparatus embodiments according to the present disclosure. In a particular embodiment of the disclosure, rotary distributor valves are used as the first and second valve means. In such an embodiment, N adsorbers are preferably mounted as an array in a rotor engaged in fluid sealing contact on first and second valve faces with a stator. The gas separation apparatus of such an embodiment may then be referred to as a rotary adsorption module ("RAM").

The rotor of a rotary adsorption module embodiment for use in the disclosed systems and processes includes a plurality of flow paths for receiving adsorbent material therein for preferentially adsorbing a first gas component in the flow paths relative to a second gas component. The gas separation system also may include compression machinery coupled to the rotary module for facilitating gas flow through the flow paths for separating the first gas component from the second gas component. The stator includes a first stator valve surface, a second stator valve surface, and plurality of function compartments opening into the stator valve surfaces. The function compartments include a gas feed compartment, and a light gas component exit compartment, and a buffer gas compartment. "Light gas" refers to withdrawn gas enriched in the second, less readily adsorbed component, which is typically withdrawn from the second ends of adsorbers via the second valve means. However, in some processes according to the present disclosure which are adapted for implementation with the above described rotary module embodiment, feed gas mixture may enter the adsorbent beds at the second end of the adsorbers via the second valve means, and light product gas may be withdrawn at the first end. Similarly, any buffer or purge steps incorporated in such processes may be performed in either direction by admitting buffer or purge gas to either the first or second end of an adsorber. In the case where the disclosed rotary module is operated utilizing a gas separation process including a substantial pressure swing component, in addition to displacement purge, the function compartments may additionally include light reflux exit and return or other compartments to conduct light reflux, blowdown, pressurization or other gas flows related to the pressure swing component of the gas separation process to and from the adsorbers. Any such gas flows, in addition to product, buffer or purge gas flows may also be transferred from one adsorber to another, for flow through the receiving adsorber in either direction, by means of fluid connection means extending between the respective function compartments opening into the first and second stator valve faces. Such inter-adsorber transfer of gas flows may be utilized for example to recycle buffer gas flows between adsorbers to effectively enhance recovery of product gas components (A and B) by capturing product flows expelled from the adsorbers at the onset of a buffer step (instead of exhausting those product flows to the atmosphere), and to reduce the volume of buffer gas required to perform the buffer steps. Additionally, recycling of buffer gas flows expelled at the onset of subsequent feed or purge steps in some embodiments of the presently disclosed processes enables the reduction of residual buffer gas remaining in adsorbers following a buffer step that may be delivered in product gas flows (containing product components A or B), thereby increasing the purity of product gas flows, and reducing any buildup of buffer gas component in cases where product gas components may be recycled through downstream systems or processes.

The rotary adsorption module may itself operate at an elevated working temperature. For example, the operating temperature of the adsorbers may range from approximately ambient temperature to an elevated temperature up to about 450° C., as may be facilitated by recuperative or regenerative heat exchange between the feed gas mixture and the displacement purge and/or buffer streams. The rotary adsorption module may be operated to support a temperature gradient along the length of the flow channels, so that for example the temperature at the first end of the adsorbers is higher than the temperature at the second end of the adsorbers. As used herein, "operating temperature of the adsorbers" denotes the temperature of a gas flowing through the adsorbers and/or the temperature of the adsorber beds.

In a further apparatus embodiment of the disclosure, a rotary adsorption module is provided that is adapted to enable separation of a feed gas mixture containing weakly adsorbed component A and relatively strongly adsorbed component B, and additionally another component E which is similarly adsorbed, or even more strongly adsorbed than component B, where it is desired to deliver enriched component A in combination with component E, and separate from a product stream including component B. The rotary adsorption module includes a rotor and stator, and associated function compartments, as in the previous module embodiment described above, and additionally includes a second separate set of adsorbers in the rotor module, and associated second separate set of function compartments opening into the stator valve surface, including at least a feed gas compartment, and product gas exit compartment. The adsorbent material in the second set of adsorbers is chosen to preferentially adsorb component E relative to components A and B, so that initial feed gas containing components A, B, and E may be admitted to the second set of adsorbers through the second set of function compartments first, in order to separate component E, and provide a second feed gas mixture substantially free of component E to the first set of adsorbers through the first set of function compartments, for separation of components A and B using displacement purge gas component C as discussed in the previous embodiment. Following separation of components A and B, the resultant product gas enriched in component A may be admitted to the second set of adsorbers which have been previously loaded with adsorbed component E, for desorption of component E to produce a product stream containing enriched components A and E for external delivery and use. As described in the previous module embodiment above, in cases where components A and C are incompatible, a buffer gas component D may be used to sweep remnants of components A and C from the first set of adsorber beds prior to and after displacement purge steps. Further, as also described above, additional steps may be added to the separation of components A and B to implement a pressure swing or temperature swing component to the separation process, using such optional additional function compartments as described above for transferring such gas flows between adsorbers of the first set. Similarly, additional steps may be added to the separation of component E from the feed gas, in order to implement a pressure or temperature swing component to the separation, and such additional function compartments as may be necessary to transfer such gas flows between adsorbers of the first set may be included in the second set of function compartments opening into the stator valve surface. Further, as in the previous embodiment described above, gas flows through adsorbers may occur in either direction, and may be transferred between first and second ends of adsorbers, in order to provide for recycling of buffer gas flows, for example. In the present apparatus embodiment, the first and second sets of adsorbers, and corresponding sets of function compartments may be spatially arranged within the rotor and stator assemblies respectively in any configuration suitable to allow for the necessary transfer of gas streams between the adsorber sets as described above. Possible configurations include coaxial annular arrangement such that the first and second sets of adsorbers and function compartments form two separate annular units spaced radially from each other around a common central axis.

An exemplary application of the above two apparatus embodiments is disclosed, directed to hydrogen (component A) enrichment from syngas mixtures as the first gas mixture, where dilute carbon dioxide (component B) is to be separated, typically for rejection directly to the atmosphere, and with air or preferably nitrogen-enriched air as the displacement purge stream containing oxygen (component C). The presently disclosed apparatus allows exploitation of the fact that air contains only trace quantities of carbon dioxide to use air or preferably nitrogen-enriched air as the displacement purge stream to strip carbon dioxide from a syngas stream at low pressure, and thus achieve useful hydrogen enrichment without compression to elevated pressures. In a case where water vapour (component E) is present in the feed gas in substantial amounts, and it is desired to deliver the water vapour in the same purge stream exhaust along with carbon dioxide and purge gas, an adsorption module with one set of adsorbers may be used, and the adsorbent material in the adsorbers would typically be selected from those known in the art as effective to separate carbon dioxide in the presence of significant levels of water vapor, particularly in applications where the separation is performed at elevated temperature. The buffer gas (component D) may be selected from any available less-adsorbed gas not containing component A or C, and which is compatible with components A and C, including for example inert gases. Without the buffer steps and other features of the presently disclosed apparatus to prevent cross-contamination between oxygen and fuel components including hydrogen in this exemplary application, the use of air or nitrogen-enriched air to purge hydrogen enrichment adsorbers would not usually be contemplated in view of safety concerns. In a case where water vapour (component E) is present in substantial amounts, and it is desired to deliver the water vapour in combination with the enriched hydrogen product, an adsorption module with two sets of adsorbers may be used, wherein the adsorbent in the first adsorber set would typically be selected from those known in the art to preferentially adsorb carbon dioxide over hydrogen at the operational temperature of interest, and the adsorbent in the second adsorber set would typically be selected from those know to preferentially adsorb water vapour over both carbon dioxide and hydrogen at the operational temperature of interest.

In the above exemplary application for separation of syngas feed gas mixtures near ambient temperature, suitable known adsorbents include activated alumina, alumina gel and silica gel for adsorption of water vapour, and activated carbons, hydrophilic zeolites (e.g. type 13X zeolite and many other zeolites known in the art), and hydrophobic zeolites (e.g. type Y zeolite or silicalite) for adsorption of carbon dioxide. If the displacement purge stream is itself humid, it may be advantageous to use relatively hydrophobic adsorbents such as active carbons and zeolites such as Y-zeolite or silicalite. Alternatively, the adsorbent in the rotary adsorption module may be chosen to be selective at an elevated operating temperature (e.g., about 250° C. to about 400° C.) for particular components of the gas mixture to be separated. For example, in the above-described application for the separation of moist syngas, the adsorbent may be chosen to be selective for carbon dioxide in preference to water vapor. Suitable such adsorbents known in the art include alkali-promoted materials. Illustrative alkali-promoted materials include those containing cations of alkali metals such as Li, Na, K, Cs, Rb, and/or alkaline earth metals such as Ca, Sr, and Ba. The materials typically may be provided as the hydroxide, carbonate, bicarbonate, acetate, phosphate, nitrate or organic acid salt compound of the alkali or alkaline earth metals. Such compounds may be deposited on any suitable substrate such as alumina. Examples of specific materials for elevated temperature operation includes alumina impregnated with potassium carbonate and hydrotalcite promoted with potassium carbonate, as disclosed in the prior art.

While the adsorbent employed in the adsorbers according to the disclosure may be conventional granular forms of adsorbent, it has been found to be advantageous within the disclosed apparatus and process embodiments that the adsorbent materials be supported in a parallel passage monolith of high surface area, so that the process may be conducted at relatively high cycle frequency (e.g. cycle period of about 1 second to about 10 seconds) in a compact apparatus which contains only a small inventory of adsorbent and consequently of components A and B which may be mutually chemically reactive. It has been found to be particularly advantageous that the adsorbent be supported as a laminated sheet structure ("adsorbent laminate") on thin substrate sheets with spacing means between the sheets to separate the sheets and form flow passages. Further details relating to the selection and construction of suitable such adsorbent laminates may be found in the applicant's copending U.S. patent application Ser. No. 10/041,536 which is hereby incorporated by reference. It has been found that for use in the presently disclosed systems and processes (gas separation by displacement purge-based process) adsorbent laminate structures having relatively low void fractions (from about 10% –50% of structure volume) and relatively low pressure drop (compared to similarly sized adsorbers incorporating conventional beaded adsorbents) are advantageous. The void fraction, adsorbent loading density and pressure drop characteristics of an adsorbent laminate structure as disclosed above may be varied according to the feed, purge and buffer gas compositions, adsorbent materials selected and process requirements by selecting the thickness of laminate sheets and spacing means used to form the laminate structure, unlike the relatively fixed void fraction (approximately 33%) of adsorbers incorporating conventional beaded adsorbents. It has further been found that for use in the presently disclosed systems and processes, especially in the cases where feed gas component B is somewhat weakly adsorbed on the adsorbent material in use, or where a buffer gas is used to prevent mixing of components A and C, adsorbent laminate structures with void ratios in the range of about 20% –30%, and relatively low pressure drops are particularly advantageous. Suitable adsorbent laminate structures for use in the disclosed systems and processes may be formed using thin metallic substrate materials, such as for example stainless steel mesh from about 100–300 microns thick, which may be combined with similar metallic mesh or expanded metal foil materials as exemplary spacing means between adsorbent layers. Laminate structures formed from such metallic substrate and spacer materials typically possess a relatively high thermal mass, and may provide advantageous function as an effective flame arrestor to suppress any accidental reaction between mutually reactive components A and C that may occur as the result of any mechanical or structural failure of the apparatus. Alternatively, suitable adsorbent laminate structures for use in the disclosed systems and processes may be formed using thin composite substrate materials, such as for example fiberglass mesh or scrim from about 100–300 microns thick, which may be combined with ceramic printed or other non-metallic spacing materials between adsorbent layers. Such laminate structures typically possess a relatively low thermal mass, and may facilitate rapid changes in temperature within an adsorber, which is advantageous in disclosed systems incorporating a gas separation process with a temperature swing component operating at relatively high cycle speeds.

In a further exemplary application of the presently disclosed systems and processes to advanced power generation technologies such as solid oxide fuel cells, it will be appreciated that overall efficiency of the power generation system can be unexpectedly boosted by the systems and processes of the disclosure which will enable the separation and recycle of enriched hydrogen to the fuel cell anode while diluting carbon dioxide into the atmosphere, thus capturing extra free energy beyond that normally credited to a combustion process with carbon dioxide delivered at a reference pressure of one bar.

The foregoing features and advantages will become more apparent from the following detailed description of several embodiments that proceeds with reference to the accompanying figures.

BRIEF DESCRIPTION OF THE DRAWINGS

Certain embodiments are described below with reference to the following figures.

DETAILED DESCRIPTION OF SEVERAL EMBODIMENTS

FIGS. 1–4

A rotary adsorption module with displacement purge regeneration is described below in connection with FIGS. 1–4. As used herein, a "rotary adsorption module" includes, but is not limited to, either a device wherein an array of adsorbers rotates relative to a fixed valve face or stator or a device wherein the valve face or stator rotates relative to an array of adsorbers. Illustrated embodiments have the adsorbers mounted in a rotor, with the rotor in a housing, which is a stator with fixed valve faces.

Figure 1:
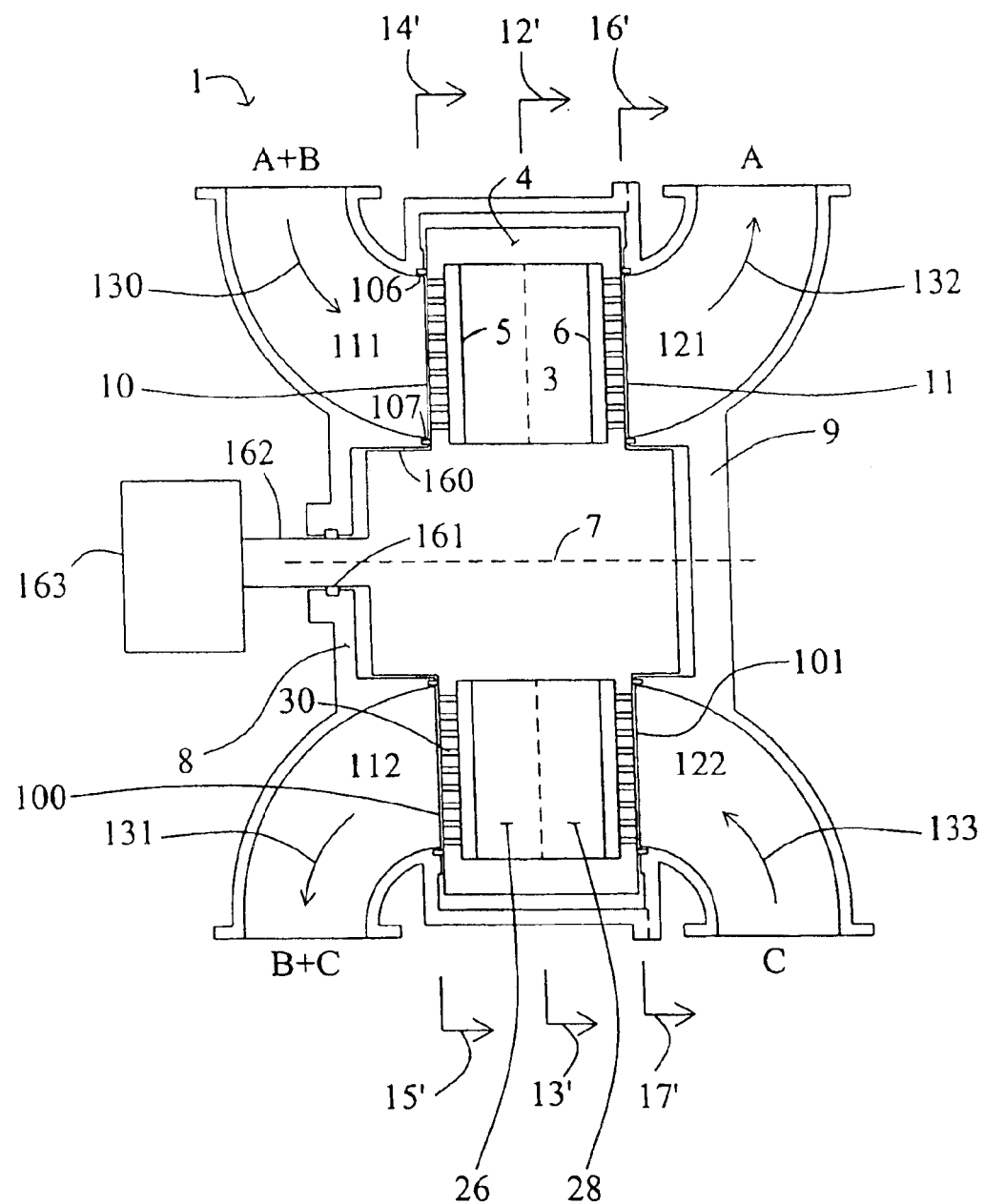
FIG. 1 shows an axial section of a rotary adsorption module.

FIG. 1 shows a rotary adsorption module 1, which includes a number "N" (where N is an integer number equal to or greater than 2) of adsorbers 3 or adsorber channels 3 in adsorber housing body 4. Each adsorber has a first end 5 and a second end 6, with a flow path therebetween contacting an adsorbent material over which a gas component B is more readily adsorbed relative to a component A and a component C which are less readily adsorbed. The adsorbers are deployed in an axisymmetric array about axis 7 of the adsorber housing body. The housing body 4 is in relative rotary motion about axis 7 with first and second functional bodies 8 and 9, being engaged across a first valve face 10 with the first functional body 8 to which a first gas mixture containing components A and B is supplied in a first sector and from which a second gas mixture containing components B and C is withdrawn from a second sector, and across a second valve face 11 with the second functional body 9 from which a first or light product enriched in component A is withdrawn in a first sector and to which a displacement purge stream containing component C is supplied in a second sector.

In embodiments as particularly depicted in FIGS. 1–5, the adsorber housing 4 rotates and shall henceforth be referred to as the adsorber rotor 4, while the first and second functional bodies are stationary and together constitute a stator assembly of the module. The first functional body shall henceforth be referred to as the first valve stator 8, and the second functional body shall henceforth be referred to as the second valve stator 9. In other embodiments, the adsorber housing 4 may be stationary, while the first and second functional bodies are rotary distributor valve rotors.

In the embodiment shown in FIGS. 1–4, the flow path through the adsorbers is parallel to axis 7, so that the flow direction is axial, while the first and second valve faces are shown as flat annular discs normal to axis 7. However, more generally the flow direction in the adsorbers may be axial or radial relative to the axis of rotation of the rotor or a combination thereof, and the first and second valve faces may be shaped according to any figure of revolution centred on axis 7, such as planar, conical, cylindrical, etc. The steps of the process and the functional compartments to be defined will be in the same angular relationship regardless of a radial or axial flow direction in the adsorbers.

Figure 2:
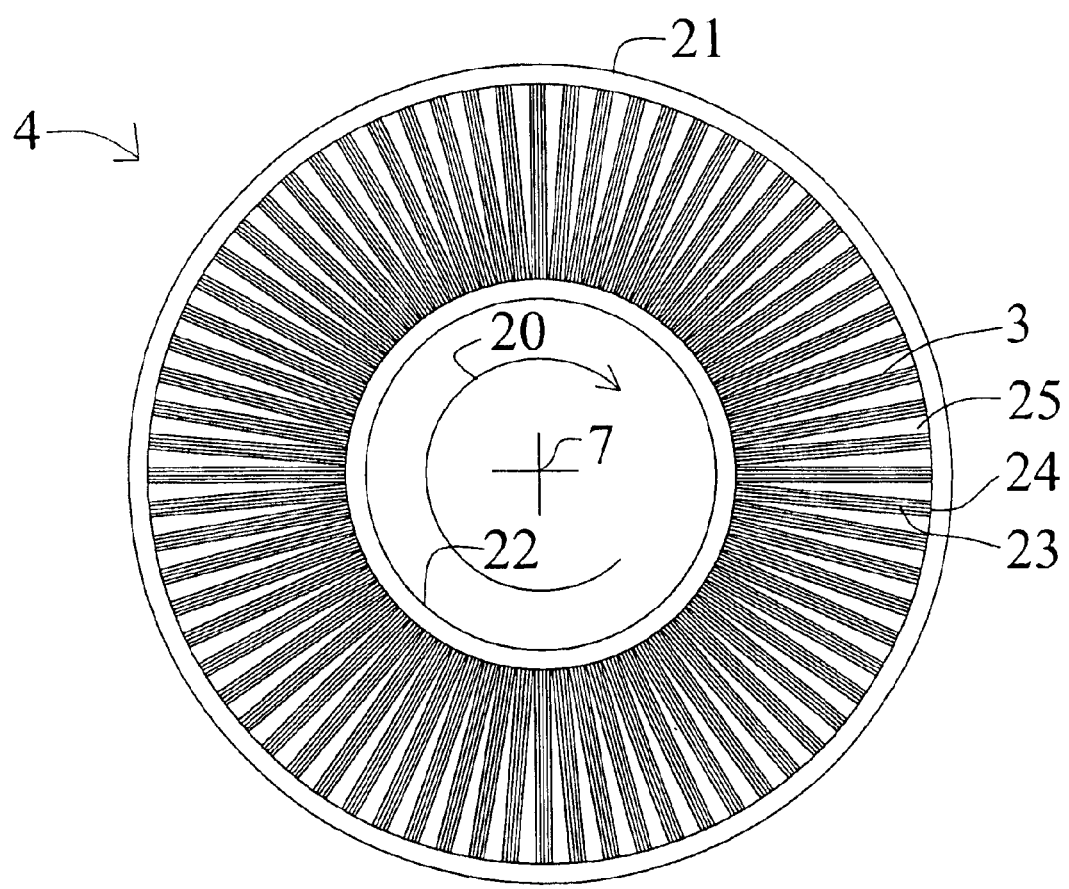
FIGS. 2 through 4 show transverse sections of the module of FIG. 1.
Figure 3:
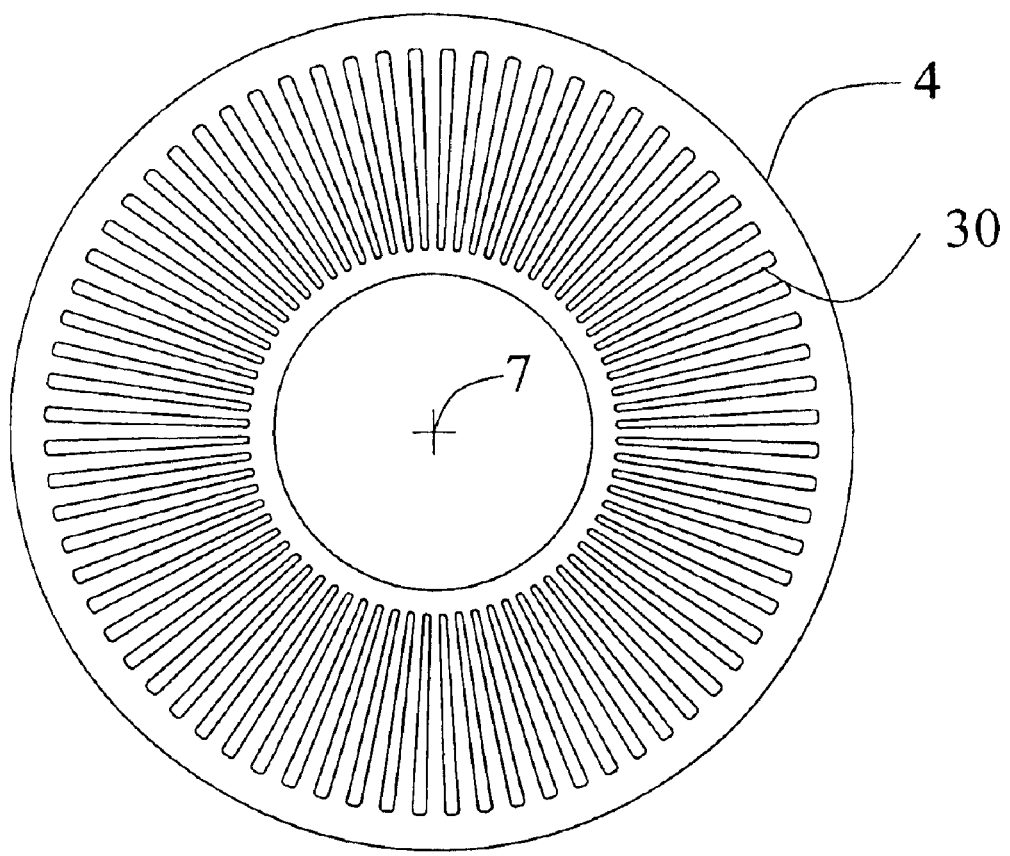
Figure 4:
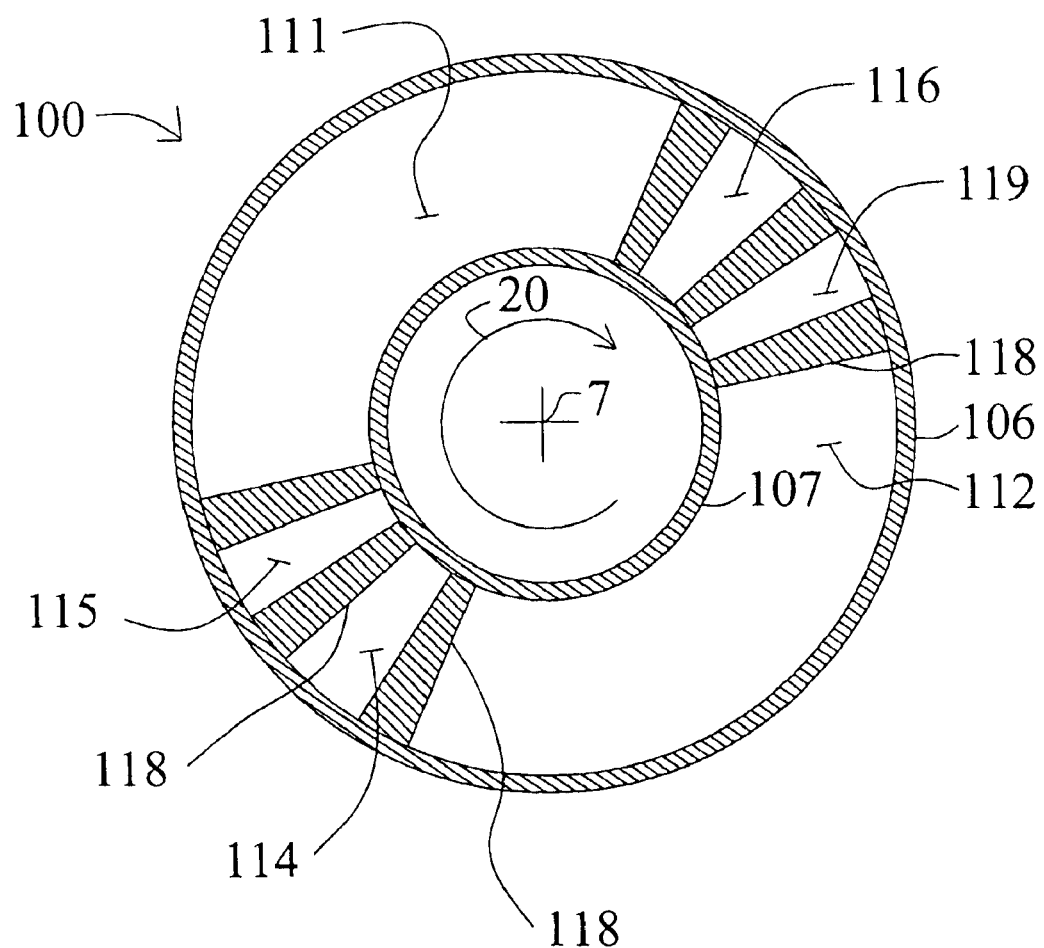

FIGS. 2–4 are cross-sections of module I in the planes defined by arrows 12'–13', 14'–15', and 16'–17'. Arrow 20 in each section shows the direction of rotation of the rotor 4.

FIG. 2 shows section 12'–13' across FIG. 1, which crosses the adsorber rotor. Here, "N"=72. The adsorbers 3 are mounted between outer wall 21 and inner wall 22 of adsorber wheel 204. Each adsorber in the particular embodiment depicted comprises a rectangular flat pack 3 of adsorbent sheets 23, with spacers 24 between the sheets to define flow channels shown here in the axial direction. Separators 25 are provided between the adsorbers to fill void space and prevent leakage between the adsorbers. The adsorber packs 3 may be radially tapered to improve the volume packing of adsorbent. In alternative embodiments, the adsorbers may comprise multiple layers of adsorbent laminate oriented in a concentric spirally wrapped configuration, or other suitable monolithic structure, or alternatively may compose beaded or other particulate adsorbent arrangements.

As shown in FIG. 1, the adsorbers 3 may include a plurality of distinct zones between the first end 5 and the second end 6 of the flow channels, here shown as two zones respectively a first zone 26 adjacent the first end 5 and a second zone 28 adjacent the second end 6. Each zone in the adsorber 3 may incorporate a different adsorbent material composition. As an alternative to distinct zones of distinct adsorbent materials, the different adsorbent materials may be provided in layers or mixtures that include varying gradients of adsorbent material concentrations along the gas flow path. The transition from one adsorbent material to another may also be a blended mixture of the two adsorbent materials rather than a distinct transition. A further option is to provide a mixture of the different adsorbent materials that may or may not be homogeneous.

In the case of a H2 adsorption separator operating at ambient temperature up to about 250° C., the first zone may contain an adsorbent or desiccant material selected for removing very strongly adsorbed components of the feed gas mixture (component E), such as water or methanol vapor, and some carbon dioxide (component B). The second zone may contain an adsorbent typically selected for bulk separation of carbon dioxide (component B).

In the case of a H2 PSA operating at about 250° C. to about 500° C., the first zone may contain an adsorbent that preferentially adsorbs CO2 relative to water vapor as described above. The second zone may contain an adsorbent (e.g., zeolite, Cu(I)-containing material, or Ag(I)-containing material) that preferentially adsorbs CO relative to water vapor. According to one version, the CO2-selective adsorbent and the CO-selective adsorbent may be included or mixed together in a single zone rather than in two distinct zones.

The adsorbent sheets comprise a substrate (e.g., glass fibre, metal foil or wire mesh) to which the adsorbent material is attached with a suitable binder, as disclosed in more detail above. Satisfactory adsorbent sheets have been made by coating a slurry of zeolite crystals with binder constituents onto the substrate, with successful examples including nonwoven fibreglass scrims, woven metal (wire mesh) fabrics, and expanded metallic (such as aluminium) foils. Spacing means may be provided by printing or embossing the adsorbent sheet with a raised pattern, or by placing a fabricated spacer between adjacent pairs of adsorbent sheets. Alternative satisfactory spacers have been provided as woven metal (wire mesh) screens, non-woven fibreglass scrims, and metal foils with etched flow channels in a photolithographic pattern. Adsorbers of the layered adsorbent sheet material may be formed by stacking flat or curved sheets, or by forming a spiral roll, with the flow channels between the sheets extending from the first end of the adsorber to the second end thereof, to substantially fill the volume of the adsorber housing of the desired shape. Examples of methods and structures with packed, spirally wound adsorbents are disclosed in commonly owned, co-pending U.S. patent application Ser. No. 10/041,536, filed Jan. 7, 2002, and incorporated herein by reference, as noted above.

Typical experimental sheet thicknesses have varied between about 100–500 microns, with spacer heights in the range of about 75 to 300 microns, and adsorber flow channel lengths in the range of about 10 cm to approximately 60 cm.

In other embodiments of the invention, the adsorbers may be provided as an array of spiral rolls of adsorbent sheet and spacers as described above, with the array supported in a rotor.

Alternatively, the adsorbers may be formed by winding a single spiral roll of adsorbent sheet around the rotor hub and filling the annulus to wall 21. Spacers between adjacent adsorbent sheet layers may be formed by longitudinal spacers or corrugations, establishing axial flow channels between the sheets and extending between the first end 5 and second end 6, while the spacers or corrugations prevent flow transverse to the flow channels or between adjacent flow channels. Consequently, each such flow channel is isolated from neighbouring flow channels through the adsorbent mass, and serves as a small independent adsorber. With this approach, the number N of independent adsorbers may be extremely large.

Also alternatively, the adsorbers may be provided as flow channels in a monolith, for example a honeycomb cordierite extrudate with adsorbent material wash coated onto the cell walls of the honeycomb. The rotor may be formed from a single extrudate section, or from an array of such sections supported on the rotor.

In all cases, the adsorbers and rotor are assembled with co-operating fluid sealing means so that substantially all-fluid flow between the first and second ends of the adsorbers passes through the flow channels in the adsorbers, so that bypass leakage is avoided.

FIG. 3 shows the porting of rotor 4 in the first and second valve faces respectively in the planes defined by arrows 14'–15', and 16'–17'. An adsorber port 30 provides fluid communication directly from the first or second end of each adsorber to respectively the first or second valve face. Each such port 30 may be equivalently provided by a number of small ports for each adsorber.

Figure 5:
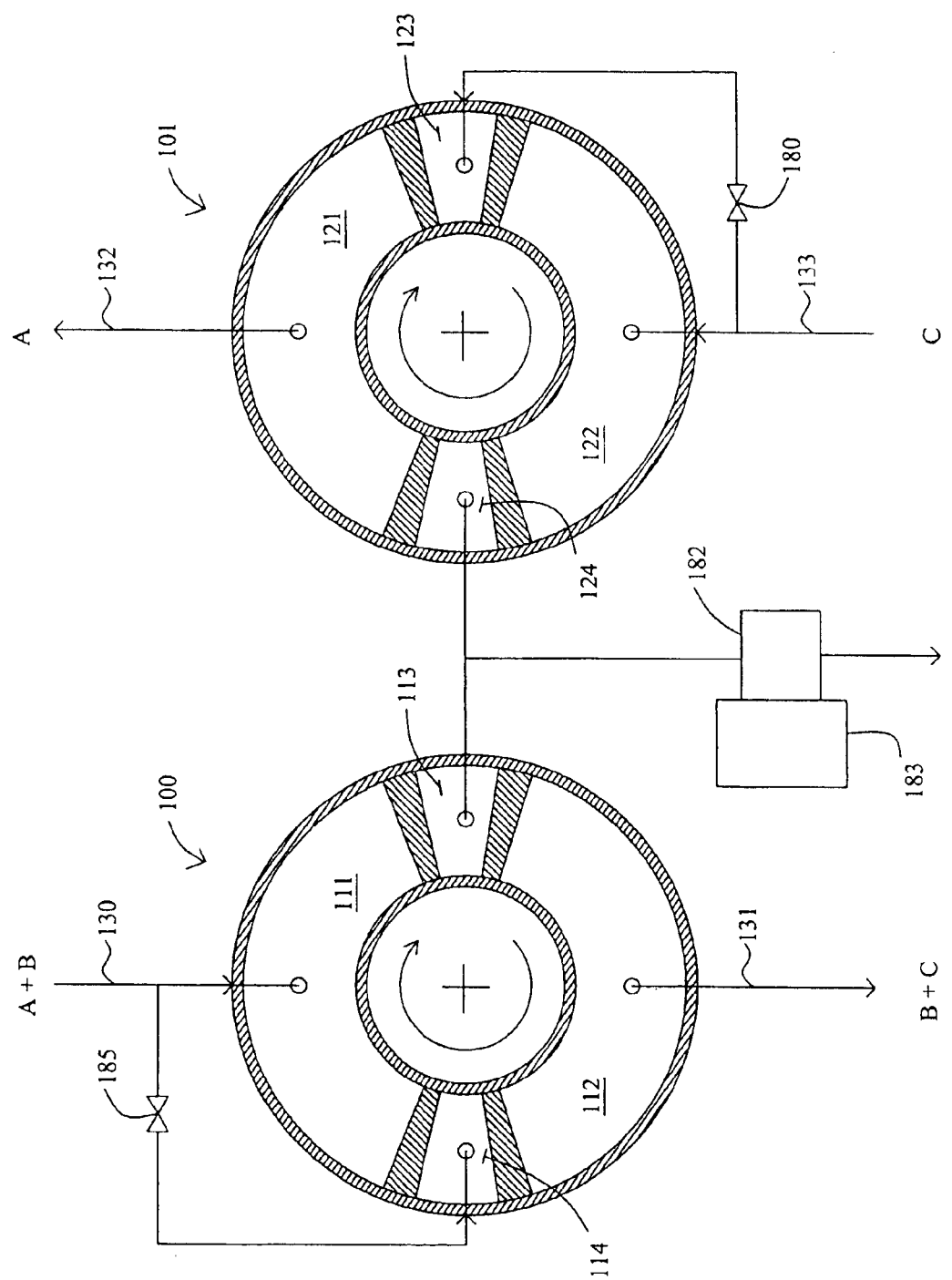
FIGS. 5 through 12 show alternative buffer step purge embodiments for the module of FIG. 1.
Figure 7:
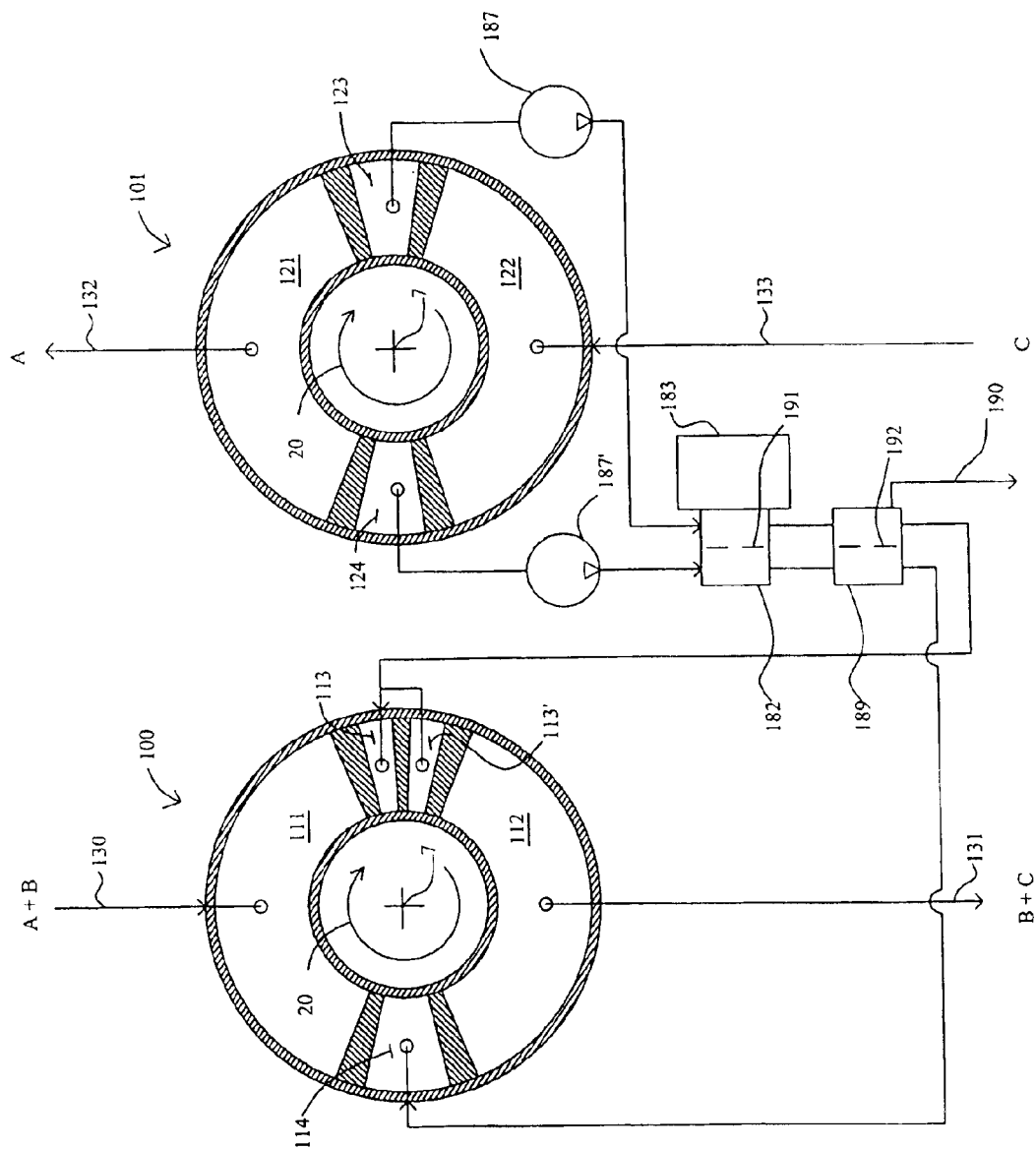
Figure 9:
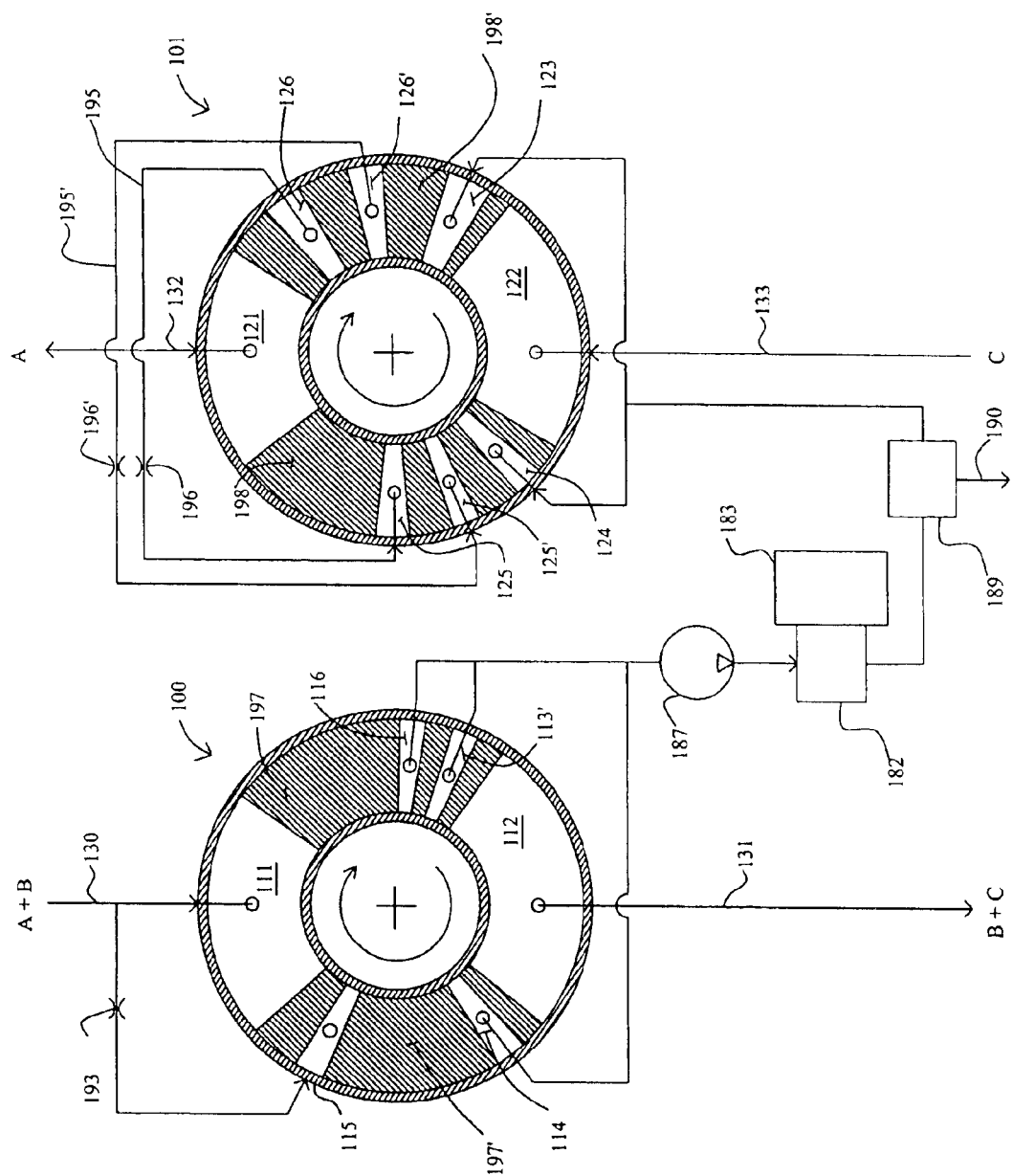

FIG. 4 shows a typical stator valve face 100 of the first stator 8 in the first valve face 10 and in the plane defined by arrows 14'–15', similar to a valve face 101 of the second stator 9 in the second valve face 11 and in the plane defined by arrows 16'–17'. Arrow 20 indicates the direction of rotation by the adsorber rotor. In the annular valve face between circumferential seals 106 and 107, the open area of first stator valve face 100 ported to external conduits is indicated by clear angular sectors 111–116, which are separated by radial seals 118 corresponding to the first functional ports communicating directly to functional compartments identified by the same reference numerals 111–116. Sector 119 is used for the first buffer step, and sector 114 is used for the second buffer step. If pressure swing is used to augment displacement purge regeneration, a sector 115 may be provided for a pressurization step and a sector 116 may be provided for a depressurization step. Similarly, the open area of second stator valve face 101 (as shown in FIGS. 5, 7 and 9) ported to external conduits is indicated by clear angular sectors 121–126, which are also separated by radial seals 118 corresponding to the first functional ports communicating directly to functional compartments identified by the same reference numerals 111–116. Typical radial seal 118 provides a transition for an adsorber between being open to adjacent sectors. A gradual opening may be provided by a tapering clearance channel between the slipper and the sealing face, to achieve gentle pressure equalization of an adsorber being opened to a new compartment. Much wider closed sectors may be provided to substantially stop flow to or from one end of the adsorbers when pressurization or depressurization steps are being performed from the other end.

Turning back to FIG. 1, in the first valve face 100 feed gas (the first gas mixture including components A and B and potentially E) is supplied to first sector 111 as indicated by arrow 130 while heavy product (the second gas mixture including components B and C) is exhausted from second sector 112 as indicated by arrow 131. In the second valve face 101, the first or light product gas (enriched in component A) is delivered from first sector 121 as indicated by arrow 132, while displacement purge gas (including component C) is supplied to second sector 122 as indicated by arrow 133.

The rotor is supported by bearing 160 with shaft seal 161 on rotor drive shaft 162 in the first stator 8, which is integrally assembled with the first and second valve stators. The adsorber rotor is driven by motor 163 as exemplary of rotor drive means.

Figure 6:
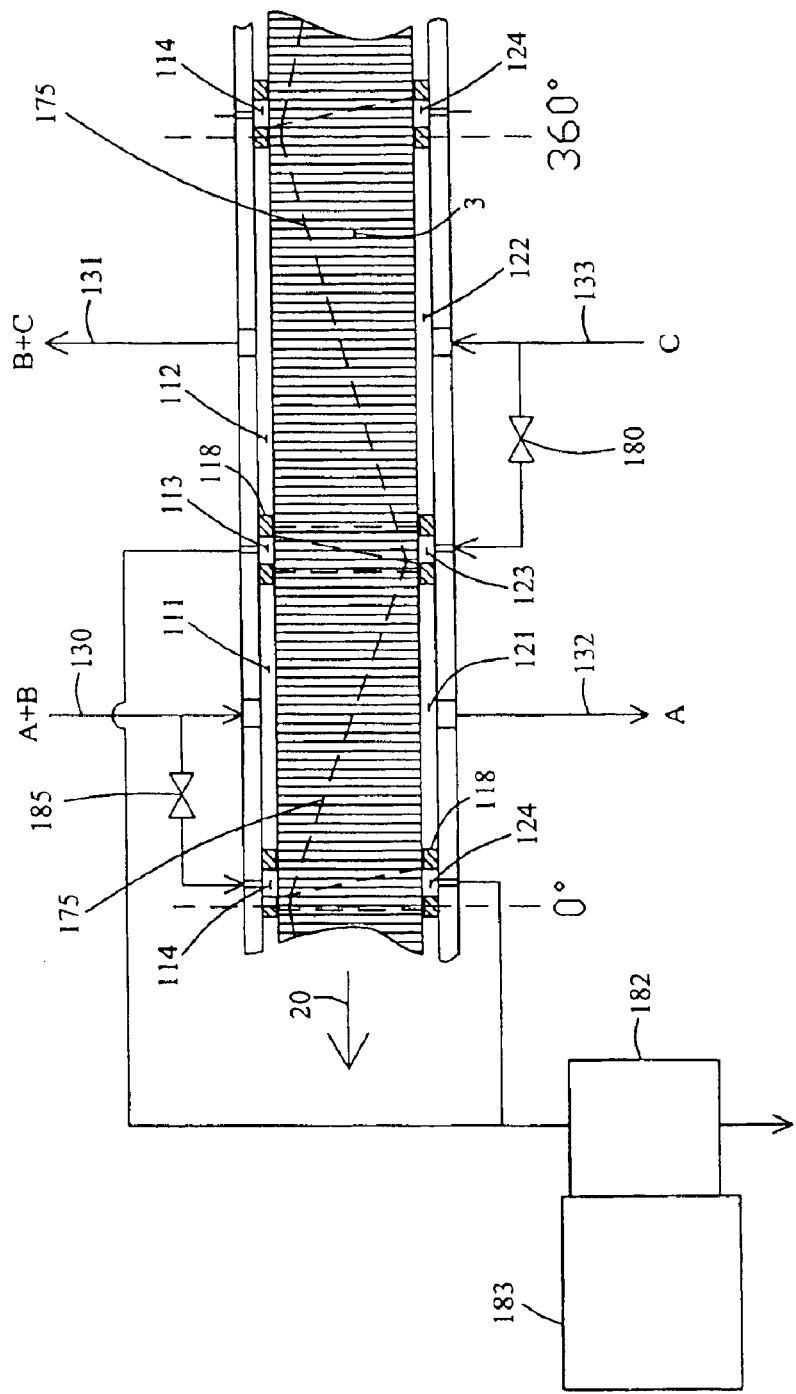

FIGS. 5 and 6

Figure 8:
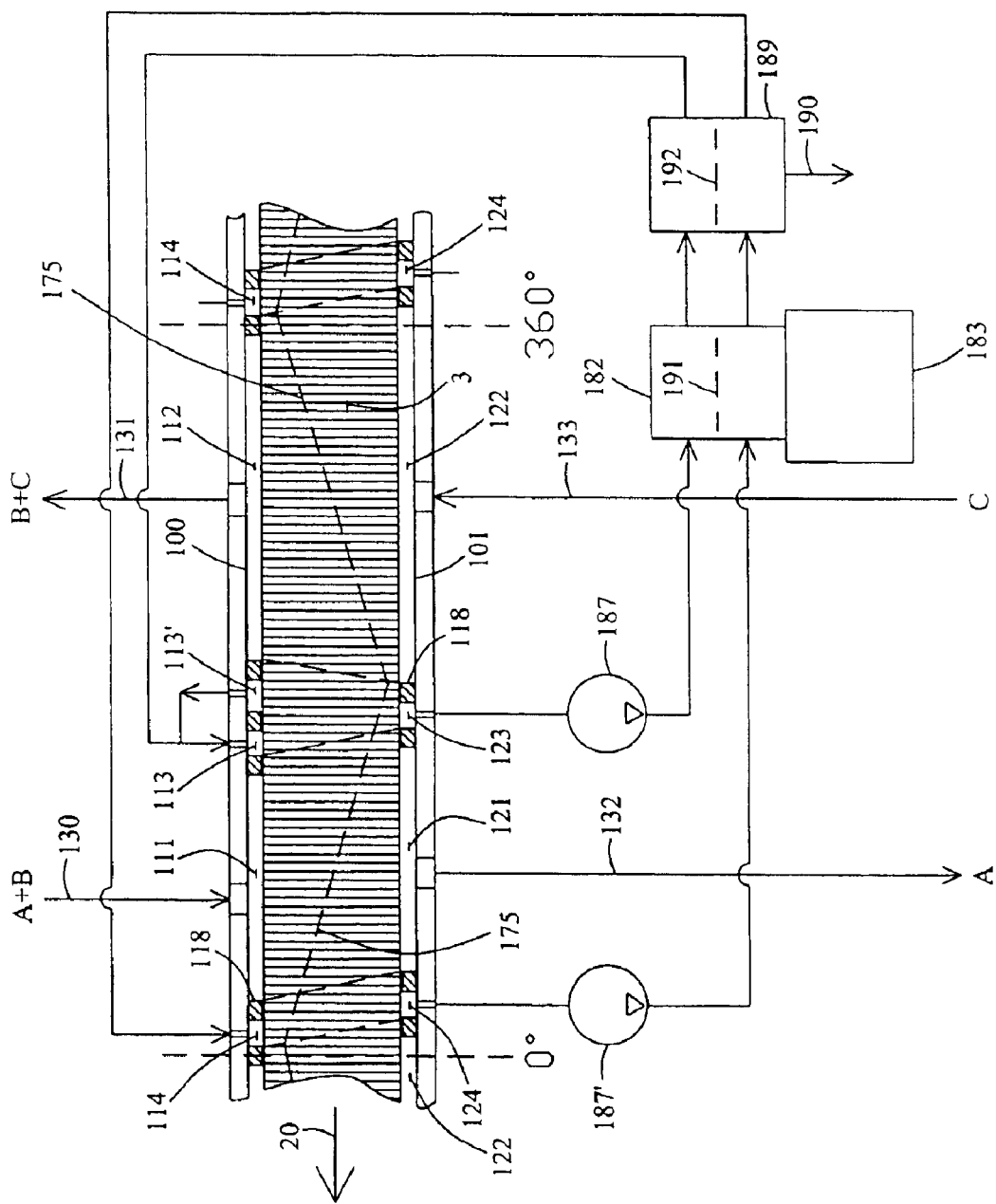
Figure 10:
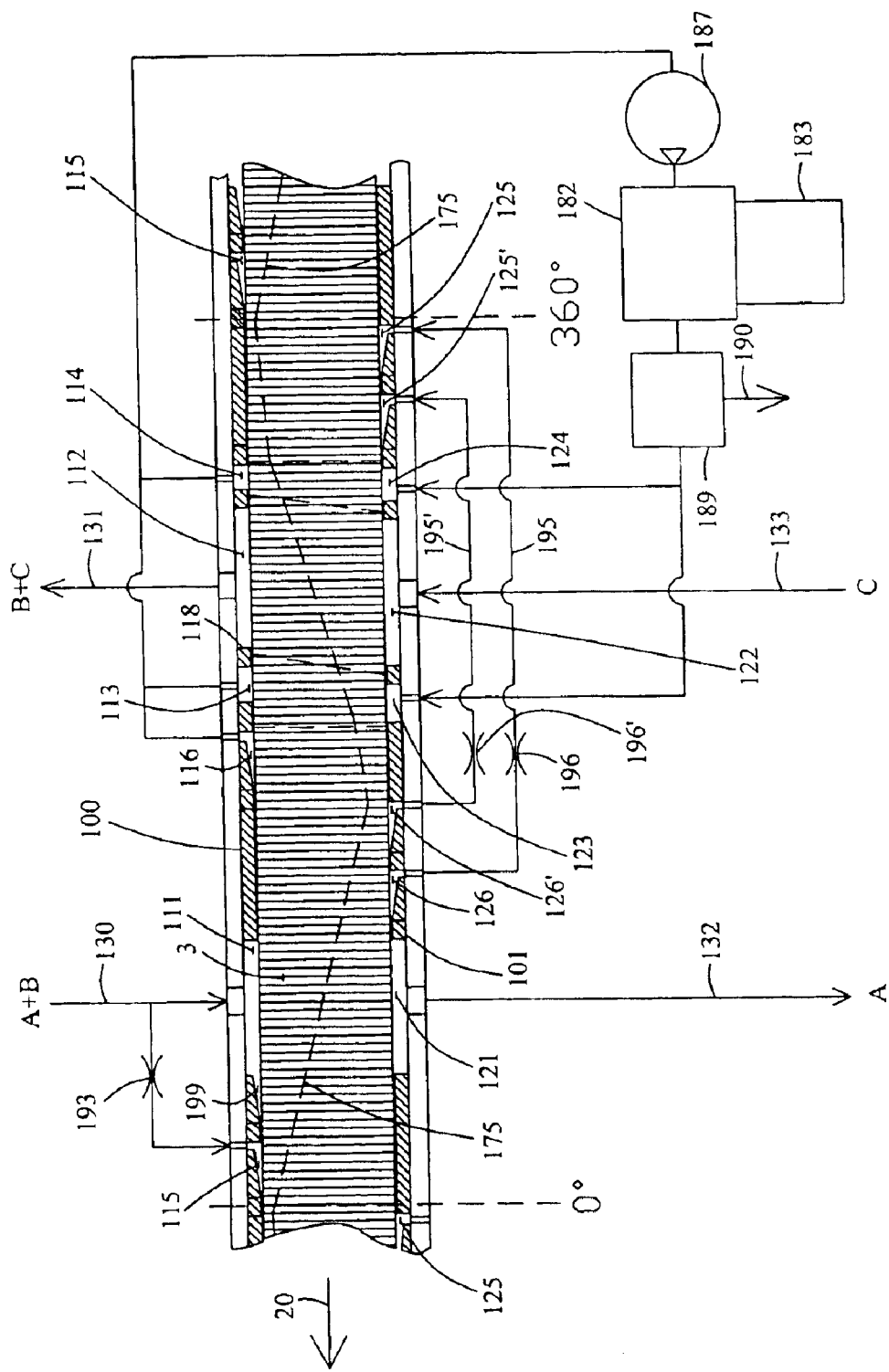

FIG. 5 shows the first and second stator valve faces 100 and 101 of an embodiment with displacement purge gas as the first buffer purge gas, and the feed or first gas mixture as the second buffer gas. In FIG. 5 and also FIGS. 7 and 9, the first and second stator valve faces are being viewed in one direction as indicated by section arrows 14'–17' so that the first stator valve face is being viewed from behind while the second valve face is being viewed from in front. FIG. 6 shows the flow pattern through the adsorbers, in a circumferential section including the angular range of 0° to 360° about axis 7. The dashed line across the adsorbers 3 in FIGS. 6, 8 and 10 represent concentration fronts between the gas mixtures A and B, B and C and components A and C. In particular, dashed line 175 indicates movement at the carbon dioxide concentration front during the cycle.

The first buffer purge gas is admitted by valve 180 to sector 123 in the second valve face 101, and displaces gas from sector 113 in the first valve face to a secondary processing unit, in this case, to burner 182 with co-operating heat recovery means 183. The second buffer purge gas is admitted by valve 185 to sector 114 in the first valve face 100, and displaces gas from sector 123 in the second valve face to burner 182 with co-operating heat recovery means 183. The heat recovery means may be a heat exchanger to preheat oxidant and fuel streams being supplied to the fuel cell, or a steam generator, or an internal combustion engine, or a gas turbine, or a Stirling engine.

FIGS. 7 and 8

FIG. 7 shows the first and second stator valve faces 100 and 101 of an embodiment with recycled flue gas as the first and second buffer purge gases, with this flue gas obtained by combustion of the buffer purge gases so that unbound component C is removed from the first buffer purge gas and unbound component A is removed from the second buffer purge gas. FIG. 8 shows the flow pattern through the adsorbers, in a circumferential section including the angular range of 0° to 360° about axis 7.

The buffer gas streams are admitted to the first valve face 100, with the first buffer stream through sector 113 and the second buffer stream through sector 114. A portion of the first buffer stream is recirculated from sector 113' back to sector 113, after being displaced by the initially entering displacement purge stream.

The first buffer stream is withdrawn from sector 123 by blower or vacuum pump 187, and the second buffer stream is withdrawn from sector 124 by blower or vacuum pump 187'. The buffer streams are passed through burner 182 with co-operating heat recovery means 183, and then through condenser 189 to reject excess water through discharge conduit 190. Complete or partial separation of the first and second buffer streams may be maintained through burner 182 and condenser 189, as indicated by dashed partitions 191 and 192, so that combustion conditions on each side of partition 191 may be maintained appropriately fuel rich on the first buffer stream side in order to remove unbound component C from the first buffer purge gas, and lean on the second buffer stream side to remove unbound component A from the second buffer purge gas. Alternatively, the first and second buffer streams may be mixed through a single blower and/or vacuum pump 187, and through the burner and condenser, by maintaining closely stoichiometric combustion conditions in the burner so that unbound components A and C are both extinguished. The burner may be a catalytic combustor in order to achieve satisfactory and sufficiently complete combustion under all conditions.

FIGS. 9 and 10

FIG. 9 shows the first and second stator valve faces 100 and 101 of an embodiment with combined pressure swing and displacement purge regeneration and with recycled flue gas as the first and second buffer purge gases. FIG. 10 shows the flow pattern through the adsorbers, in a circumferential section including the angular range of 0° to 360° about axis 7.

In the first stator valve face 100, sector 115 is used for a feed pressurization step, with feed gas mixture introduced through an orifice or pressure reduction restrictor 193, while sector 116 is used for a counter current blowdown step for depressurization preceding the first buffer step. In the second stator valve face 101, sector 125 provides a repressurization step by light reflux (pressure equalization) through conduit 195 and restrictor 196 with sector 126, which provides the corresponding depressurization step. Sector 125' provides another repressurization step by light reflux (pressure equalization) through conduit 195' and restrictor 196' with sector 126' that provides the corresponding depressurization step.

Extended closed sectors of valve face 100 are provided as wide radial seals (e.g. 197, 197') opposite the light reflux sectors 125,125', 126 and 126' of face 101. Similarly wide radial seals (e.g. 198, 198') are provided in closed sectors of valve face 101 opposite the feed pressurization sector 115 and the counter current blowdown sector 116 of face 100. It may also be noted in FIG. 10 that the radial seals leading sectors 111, 115, 116, 125, 125', 126, and 126' have tapered clearance gaps (e.g. 199) between the rotor face and the respective seal entering those sectors, so as to provide smooth pressurization and depressurization transitions by flow throttling in the tapered clearance as each adsorber comes into registration with the corresponding sector.

If desired, a purge step using light reflux of enriched component B may be included in addition to a displacement purge step including component C.

Figure 11:
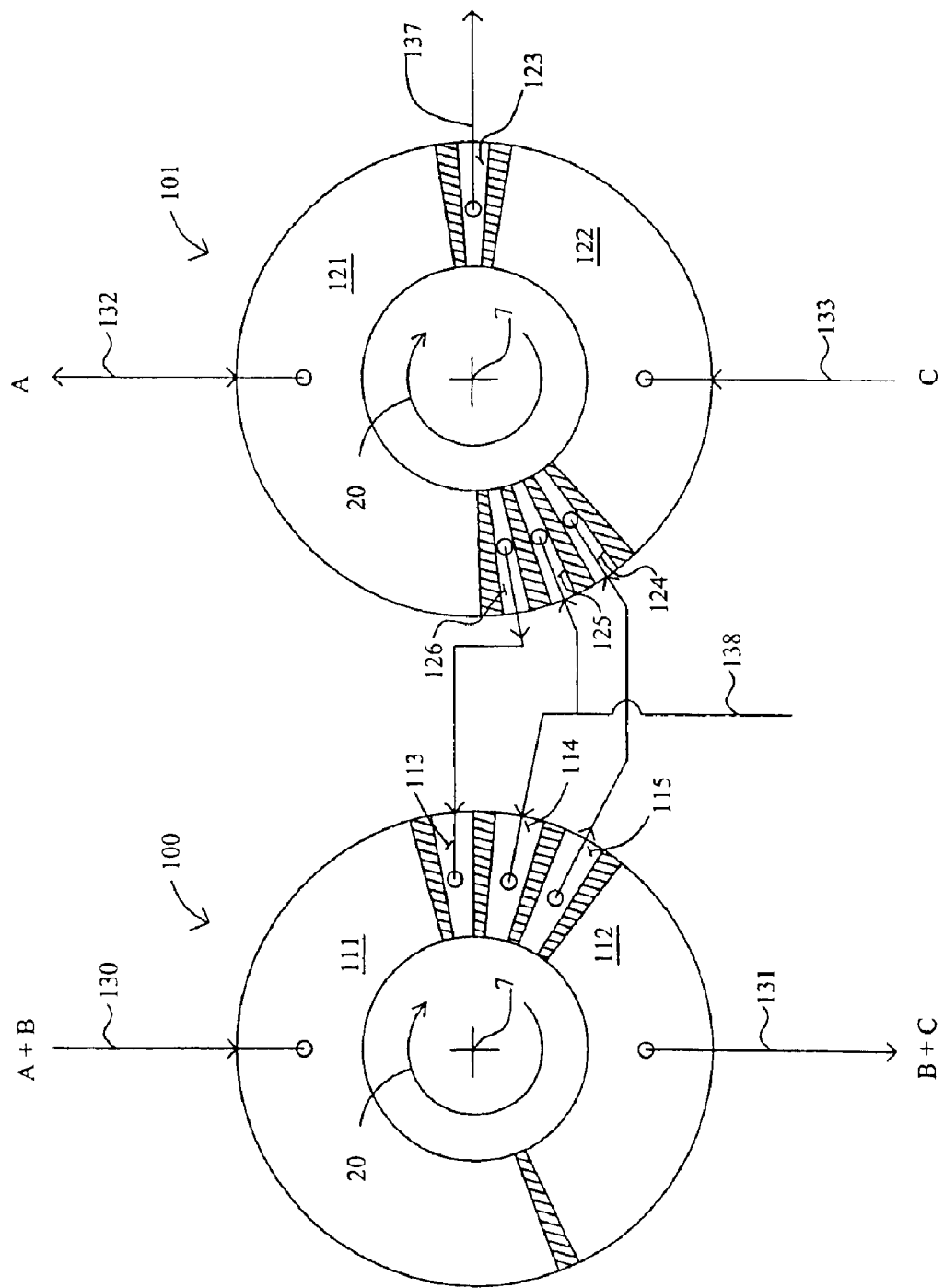
Figure 12:
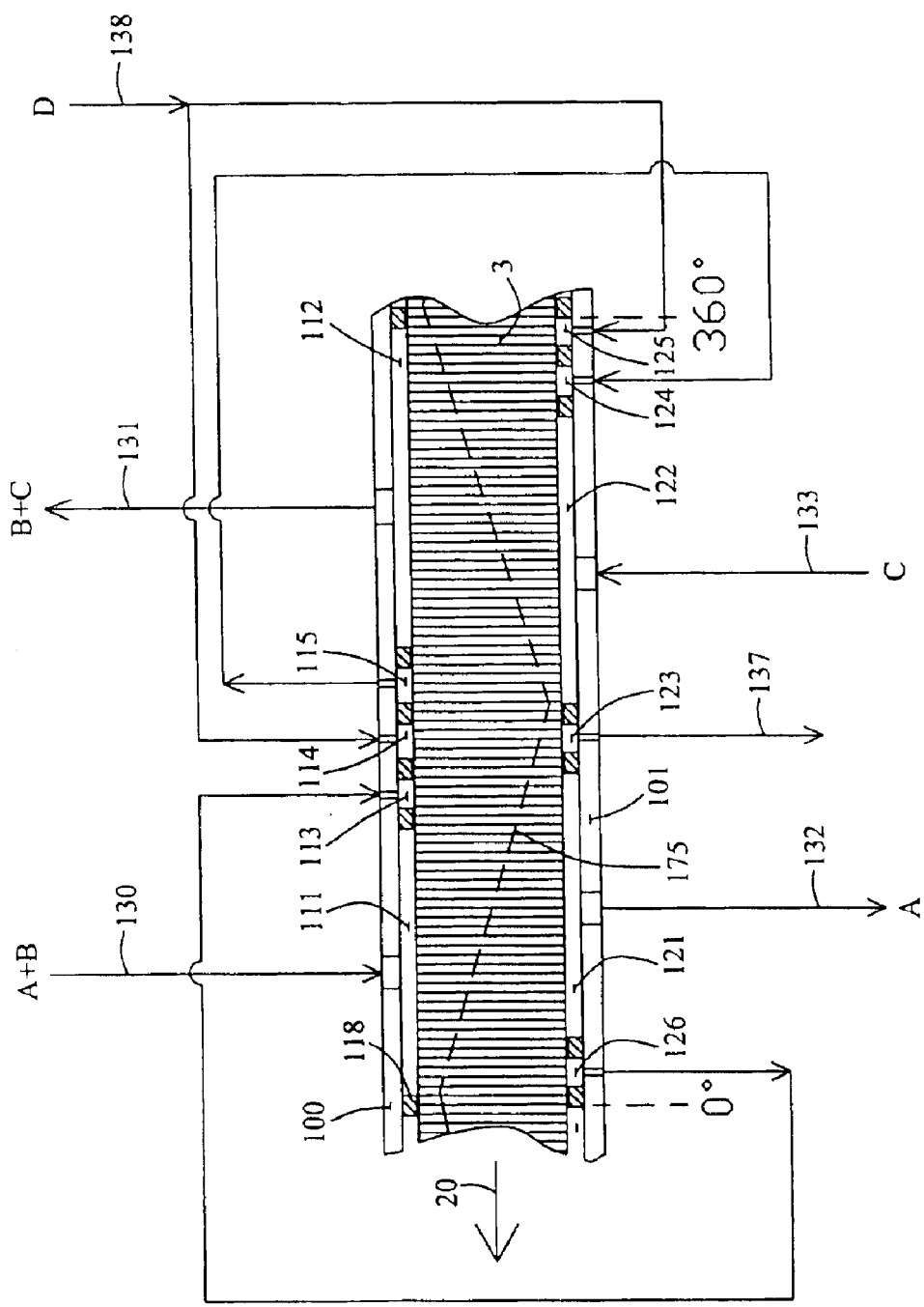

FIGS. 11 and 12

FIG. 11 shows the first and second stator valve faces 100 and 101 of an embodiment with buffer purge gases. In FIG. 11, the first and second stator valve faces are being viewed in one direction, as indicated in previous figures, so that the first stator valve face is being viewed from behind while the second valve face is being viewed from in front. FIG. 12 shows the flow pattern through the adsorbers, in a circumferential section including the angular range of 0° to 360° about axis 7. [The device separates a feed mixture of A, B, E such that A is enriched and separated from B and E, and B and E are recovered together with purge gas C].

Buffer gas streams are admitted to the first valve face 100, with the first buffer stream through sector 113 and the second buffer stream through sector 114. The first buffer stream is recirculated from sector 126 of the second valve face 101 back to sector 113, after being displaced by the initially entering feed gas mixture stream.

The first buffer stream displaces enriched component A through sector 121 of second valve face 101 thereby enhancing recovery of light component A. The second buffer stream 137 is withdrawn from sector 123 and is sent for appropriate secondary processing for regeneration of buffer gas or exhausted to flue stack. Remaining buffer gas is withdrawn from sector 115 and recycled back to sector 124 of the second valve face 101, after being displaced by the initially entering displacement purge stream.

Buffer gas streams are admitted to the second valve face 101, with the third buffer stream through sector 124 and the fourth buffer stream through sector 125. The third buffer stream is recycled as described above. The third and fourth buffer streams continue as displacement purge for component B through sector 112 of first valve face 100 thereby enhancing recovery of heavy component B. Remaining interstitial buffer gas is withdrawn from sector 126 and recycled as described above.

In such a sequence enhanced recovery of both the light and heavy components can be achieved as well as a reduction in the amount of buffer gas required. Additionally, withdrawal of the interstitial buffer gas which remains in the adsorber just prior to initiation of the following feed step for recycle to another bed may reduce any small amount of residual buffer gas which is delivered with the light product gas A during the feed step, thus increasing purity of the light product gas. The sequence timing varies depending on the number of "N" adsorber beds.

Figure 13:
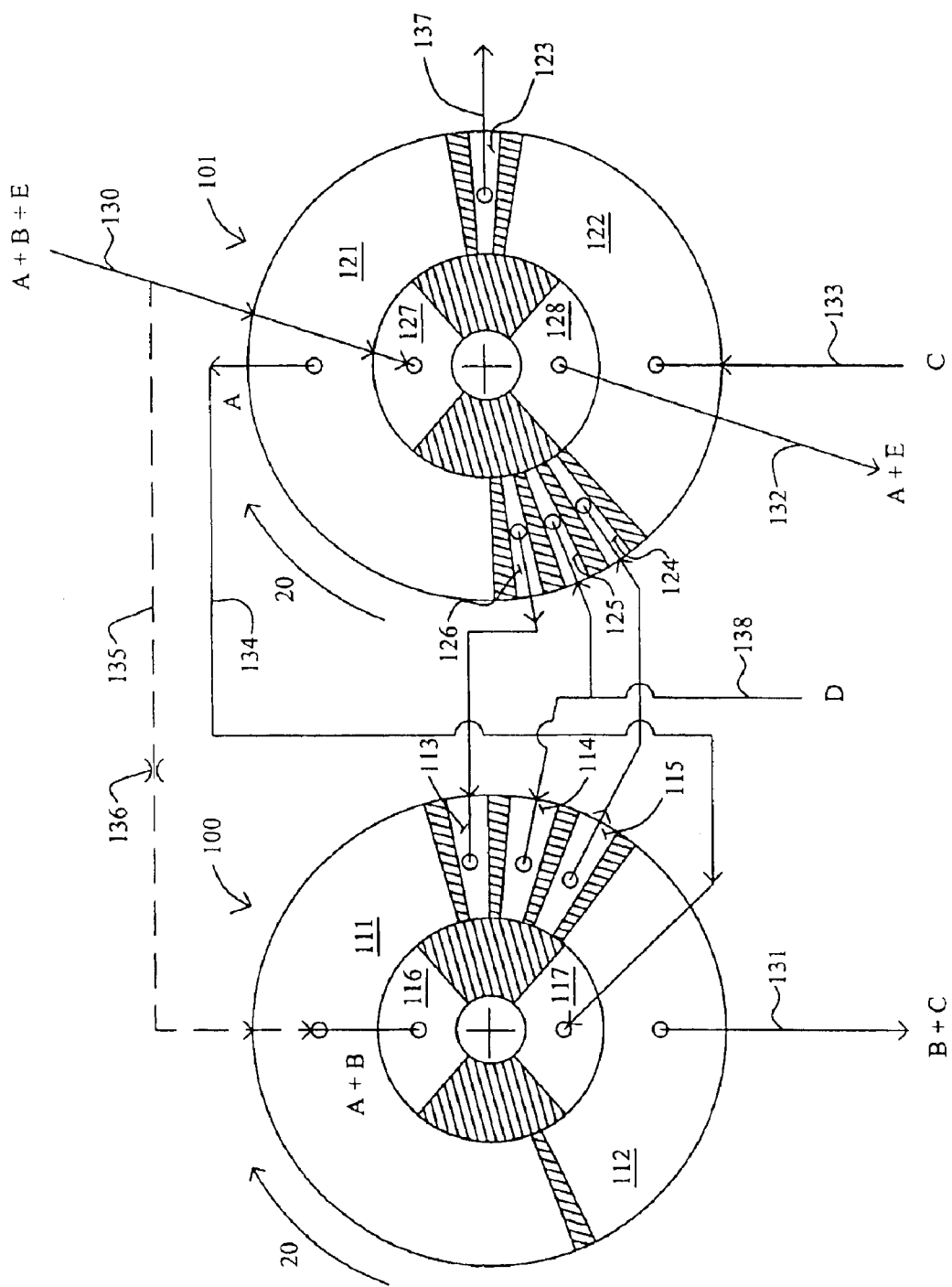
FIGS. 13 and 14 show a buffer step purge embodiments for a rotary adsorption module incorporating two separate sets of adsorbers.
Figure 14:
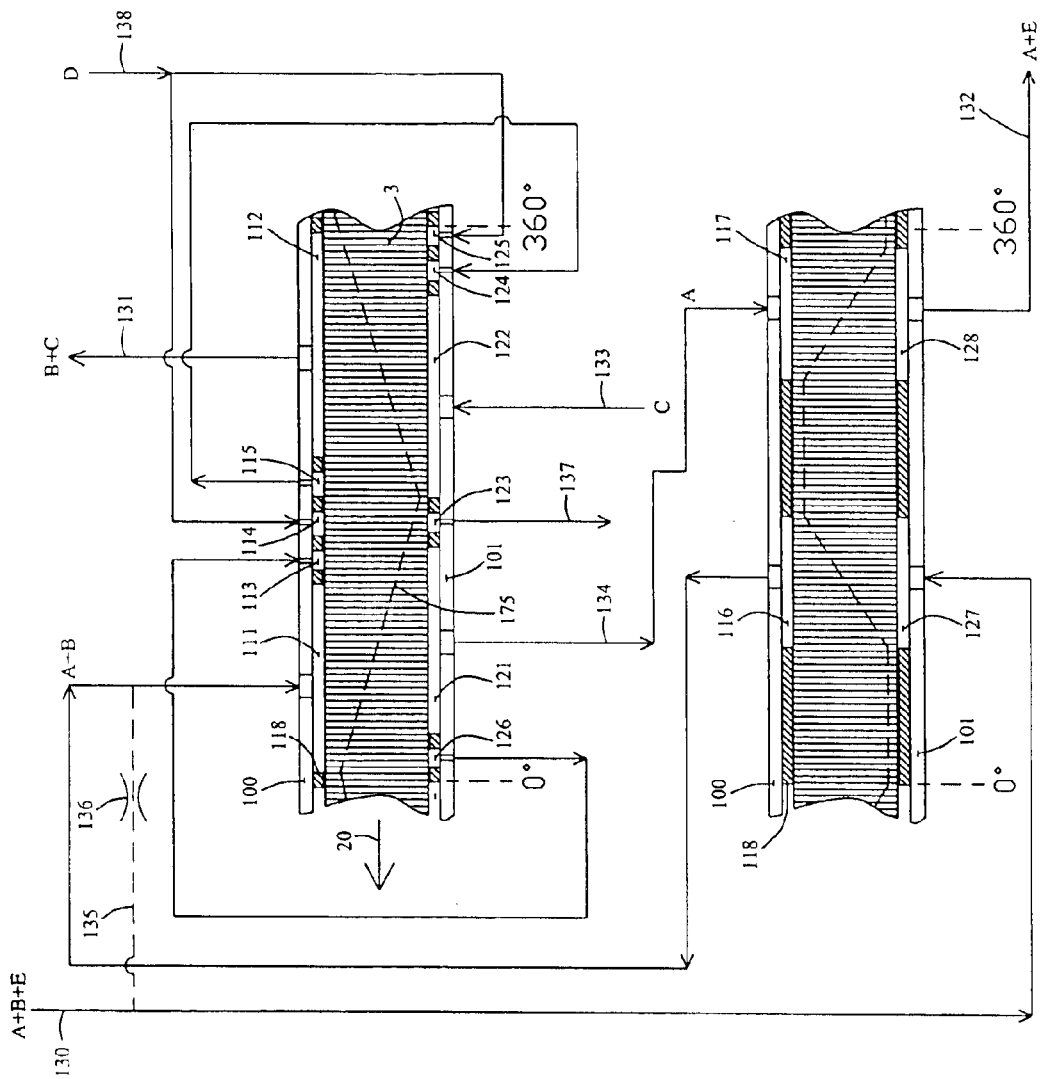

FIGS. 13 and 14

FIG. 13 shows the first and second stator valve faces 100 and 101 of an embodiment with buffer purge gases. In FIG. 13 the first and second stator valve faces are being viewed in one direction, as indicated in previous figures, so that the first stator valve face is being viewed from behind while the second valve face is being viewed from in front. FIG. 14 shows the flow pattern through dual coaxial annularly-configured adsorber sets, in a circumferential section including the angular range of 0° to 360° about axis 7.

In this example, a feed stream containing gas components A, B, and E is to be separated such that components A and E are recovered together, and component B is recovered with purge gas C.

Annular adsorber 1 contains adsorbent as in previous examples to which component B is more strongly adsorbed than both components A and E (ex. activated carbon in the case of carbon dioxide as component B, hydrogen as component A and water vapour as component E). Annular adsorber 2 contains adsorbent to which component E is more strongly adsorbed than both components A and B (ex. activated alumina in the same exemplary case described above).

Feed gas stream 130 containing components A, B, and E is admitted to the second valve face 101 through 127 of annular adsorber 2. The gas exits through 116 of the first valve face 100 and then is directed back into annular adsorber 1 sector 111 of first valve face 100. Stream 134 exits via 121 of second valve face 101 as a stream of enriched A and is directed to annular adsorber 2 sector 117 of first valve face 100. Product stream 132 exits the system as enriched product A with recovered component E from 128 of second valve face 101.

A control system can be employed in the operation of this machine which allows one to vary the amount of E that is recovered with enriched A. A portion of stream 130 can be diverted through stream 135 to sector 111 of annular adsorber 1 of first valve face 100 using flow regulating device 136. The portion of component E transferred through stream 135 will be recovered in stream 131 with components B and C. The remaining portion of stream 130 is admitted to section 127 and the E component of the portion is recovered with the enriched component A as described above.

Having illustrated and described the principles of the disclosure with reference to several embodiments, it should be apparent to those of ordinary skill in the art that the invention may be modified in arrangement and detail without departing from such principles.

We claim:

1. A displacement purge gas separation process for separating a first component from a second component of a feed gas mixture where the second component is more readily adsorbed by an adsorbent material in a displacement purge gas separation apparatus having plural adsorbers, each adsorber having a flow path in contact with an adsorbent material between a first and a second end, the process comprising:

supplying a feed gas mixture comprising at least the first component and the second component to the first end of the first adsorber;

withdrawing a product gas enriched in the first component from the second end of the first adsorber;

supplying a first buffer gas substantially free of the first component to the first adsorber to substantially displace any remaining first component from the internal space of the first adsorber; and supplying a less-readily adsorbed purge gas to the first adsorber to substantially desorb adsorbed second component from the adsorbent material.

2. The process according to claim 1 additionally comprising:

withdrawing a second portion of product gas enriched in the first component from the internal space of the first adsorber while the first buffer gas is entering the first adsorber;

withdrawing the first buffer gas from the first adsorber while the purge gas is first entering the first adsorber for recycling for use in a first buffer step in the second adsorber;

withdrawing an exhaust gas comprising the purge gas and desorbed second component from the first adsorber;

supplying a second buffer gas substantially free of purge gas components to the first adsorber to substantially displace any remaining purge gas from the internal space of the first adsorber; and withdrawing the second buffer gas from the first adsorber while resupplying a feed gas mixture for recycling for use in a second buffer step in the second adsorber.

3. The process of claim 1, further comprising recycling the first buffer gas through at least one adsorber.

4. The process of claim 1, wherein the first buffer gas is supplied to the first adsorber immediately prior to supplying the purge gas to the first adsorber.

5. The process of claim 1, further comprising supplying a second buffer gas substantially free of purge gas components to the first adsorber to substantially displace any remaining purge gas from the internal space of the first adsorber.

6. The process of claim 5, further comprising withdrawing a stream that comprises the second buffer gas and purge gas components, then separating at least a portion of the second buffer gas from the purge gas components.

7. The process of claim 6, wherein separating the second buffer gas from the purge gas components comprises combusting the purge gas components.

8. The process of claim 5, further comprising recycling the second buffer gas through at least one adsorber.

9. The process of claim 1, further comprising withdrawing a stream that comprises the first buffer gas and the first component, and then separating at least a portion of the first buffer gas from the first component.

10. The process of claim 9, wherein separating the first buffer gas from the first component comprises combusting the first component.

11. The process of claim 1, wherein the first component is hydrogen, the second component is carbon dioxide, and the purge gas is air or nitrogen-enriched air.

12. The process of claim 1, wherein at least one adsorber includes an adsorbent laminate structure having a void fraction of about 10% to 50% of the laminate structure volume.

13. The process of claim 12, wherein the void fraction is about 20% to 30%.

14. The process of claim 1, wherein the feed gas mixture is supplied to the first adsorber at a first pressure and the second component is desorbed by the purge gas at a second pressure, wherein the first pressure is different than the second pressure.

15. The process of claim 14, wherein the first buffer gas is supplied to the first adsorber at a third pressure, wherein the third pressure is different than the first pressure and the second pressure.

16. A displacement purge gas separation apparatus for separating a first component from a second component of a feed gas mixture where the second component is more readily adsorbed by an adsorbent material comprising:

plural adsorbers having first and second ends, each adsorber comprising an adsorbent material and defining a flow path in contact with the adsorbent material between the first and second ends;

at least one valve means fluidly coupled to the first and second ends of the adsorbers for delivering and withdrawing gas from the first and second ends of the adsorbers;

feed gas supply means for supplying feed gas to the adsorbers through the valve means;

purge gas supply means for supplying purge gas to the adsorbers through the valve means for the purpose of desorbing adsorbed second component gas from the adsorbent material;

buffer gas supply means for supplying buffer gas to the adsorbers through the valve means;

product gas withdrawal means for withdrawing product gas enriched in the first component from the adsorbers through the valve means;

exhaust gas withdrawal means for withdrawing purge exhaust gas comprising second component and purge gas, and substantially depleted of the first component from the adsorbers through the valve means.

17. The apparatus of claim 1, further comprising means for recycling the buffer gas through the adsorbers.

18. The apparatus of claim 1, further comprising means for withdrawing a stream that includes buffer gas and purge gas.

19. The apparatus of claim 18, further comprising means for separating at least a portion of the buffer gas from the purge gas.

20. The apparatus of claim 1, further comprising means for withdrawing a steam that include the buffer gas and the first component.

21. The apparatus of claim 20, further comprising means for separating at least a portion of the buffer gas from the first component.

22. A displacement purge module for separating a first component from a second component in a feed gas mixture where the second component is more readily adsorbed by an adsorbent material comprising:

plural adsorbers having first and second ends, each adsorber comprising an adsorbent material and defining a flow path in contact with the adsorbent material between the first and second ends;

at least one rotary distributor valve fluidly coupled to the first ends of the adsorbers, the rotary distributor valve having a stator and a rotor relatively rotatable about an axis;

drive means for rotating the rotor;

feed gas supply means for supplying feed gas to the adsorbers through the rotary distributor valve;

purge gas supply means for supplying purge gas to the adsorbers through the rotary distributor valve for the purpose of desorbing adsorbed second component gas from the adsorbent material;

product gas withdrawal means for withdrawing product gas enriched in the first component from the adsorbers through the rotary distributor valve;

exhaust gas withdrawal means for withdrawing purge exhaust gas comprising second component and purge gas, and substantially depleted of the first component from the adsorbers through the rotary distributor valve.

23. A displacement purge rotary adsorption module for separating a first component from a second component in a feed gas mixture where the second component is more readily adsorbed by an adsorbent material comprising:

a rotor and a stator mutually defining a rotary distributor valve, wherein the rotor comprises:

plural adsorbers having first and second ends, each adsorber comprising an adsorbent material and defining a flow path in contact with the adsorbent material between the first and second ends;

a first rotor valve surface fluidly coupled to the first ends of the adsorbers; and a second rotor valve surface fluidly coupled to the second ends of the adsorbers;

and wherein the stator comprises:

a first stator valve surface in relatively rotatable communication with the first rotor valve surface;

a second stator valve surface in relatively rotatable communication with the second rotor valve surface; and a plurality of function compartments opening into at least one of the first stator valve surface or the second stator valve surface comprising:

a feed gas function compartment for providing a feed gas mixture to the adsorbers through the first stator valve surface or the second stator valve surface and the first rotor valve surface or the second rotor valve surface;

a purge gas function compartment for providing a purge gas to the adsorbers through the first stator valve surface or the second stator valve surface and the first rotor valve surface or the second rotor valve surface; and a buffer gas function compartment for providing a buffer gas to the adsorbers through the first stator valve surface or the second stator valve surface and the first rotor valve surface or the second rotor valve surface.

24. The module of claim 23, wherein the adsorbent material comprises an adsorbent laminate structure having a void fraction of about 10% to 50% of the laminate structure volume.

25. The module of claim 24, wherein at least one adsorber includes at least one spacer between layers of adsorbent material.

26. The module of claim 24, wherein the void fraction is about 20% to 30%.

27. The module of claim 23, wherein at least one adsorber includes at least one spacer between layers of adsorbent material.

28. A displacement purge gas separation apparatus for separating a first component from a second component of a feed gas mixture where the second component is more readily adsorbed by an adsorbent material comprising:

a plurality of adsorbers having first and second ends, each defining a gas flow path in contact with an adsorbent material between the first and second ends, wherein at least one adsorber includes an adsorbent laminate structure having a void fraction of about 10% to 50% of the laminate structure volume;

a feed gas function compartment for providing a feed gas mixture to the adsorbers; and a displacement purge gas function compartment for providing a displacement purge gas to the adsorbers.

29. The apparatus of claim 28, wherein the void fraction is about 20% to 30%.

30. The apparatus of claim 28, further comprising a buffer gas function compartment for providing a buffer gas to the adsorbers.

31. The apparatus of claim 28, wherein at least one adsorber includes at least one spacer between layers of adsorbent material.

* * * * *